United States Patent
Yang et al.

(10) Patent No.: US 8,416,675 B2
(45) Date of Patent: Apr. 9, 2013

(54) TONE RESERVATION TECHNIQUES FOR REDUCING PEAK-TO-AVERAGE POWER RATIOS

(75) Inventors: Rongzhen Yang, Shanghai (CN); Hujun Yin, San Jose, CA (US); Yang-Seok Choi, Portland, OR (US); Linging Gui, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 12/242,751

(22) Filed: Sep. 30, 2008

(65) Prior Publication Data

US 2010/0080113 A1 Apr. 1, 2010

(51) Int. Cl.
*H04J 11/00* (2006.01)
*H04W 4/00* (2009.01)

(52) U.S. Cl.
USPC ........................................... 370/210; 370/329

(58) Field of Classification Search .................. 370/210, 370/329
See application file for complete search history.

(56) References Cited

U.S. PATENT DOCUMENTS

| 7,145,955 | B1 | 12/2006 | Böhnke et al. | |
|---|---|---|---|---|
| 7,551,676 | B1 | 6/2009 | Yan et al. | |
| 7,564,909 | B2 | 7/2009 | Sung et al. | |
| 7,602,697 | B2 * | 10/2009 | Kowalski | 370/208 |
| 7,929,501 | B2 * | 4/2011 | Leonidov et al. | 370/335 |
| 2002/0150036 | A1 | 10/2002 | Weerackody | |
| 2005/0238110 | A1 * | 10/2005 | Yun et al. | 375/260 |
| 2005/0249110 | A1 | 11/2005 | Huo et al. | |
| 2006/0250936 | A1 | 11/2006 | Chen et al. | |
| 2006/0262714 | A1 | 11/2006 | Tarokh et al. | |
| 2007/0140167 | A1 * | 6/2007 | Jang et al. | 370/329 |
| 2007/0280365 | A1 * | 12/2007 | Seki | 375/260 |
| 2007/0291860 | A1 | 12/2007 | Wang et al. | |
| 2008/0008084 | A1 | 1/2008 | Son | |
| 2008/0137767 | A1 | 6/2008 | Jaenecke | |
| 2008/0186899 | A1 | 8/2008 | Zhu et al. | |
| 2008/0287068 | A1 | 11/2008 | Etemad et al. | |
| 2009/0080556 | A1 | 3/2009 | Duan et al. | |
| 2009/0274103 | A1 | 11/2009 | Yang et al. | |
| 2009/0304108 | A1 * | 12/2009 | Kwon et al. | 375/295 |
| 2009/0323513 | A1 * | 12/2009 | Yin et al. | 370/210 |
| 2010/0002784 | A1 | 1/2010 | Hlinka et al. | |
| 2010/0008432 | A1 | 1/2010 | Kim et al. | |
| 2010/0027723 | A1 | 2/2010 | Kim et al. | |

FOREIGN PATENT DOCUMENTS

EP     2056553 A1 *  5/2009

OTHER PUBLICATIONS

Y.Z. Jiao et al, A Novel Tone Reservation Scheme with Fast Convergence for PAPR Reduction in OFDM Systems, IEEEE, 2008,ALL.*
Yang et al., "System Aided PAPR Reduction Scheme Based on TR Algorithm," U.S. Appl. No. 12/113,175, Apr. 30, 2008.

(Continued)

*Primary Examiner* — Mark Rinehart
*Assistant Examiner* — Angel Brockman
(74) *Attorney, Agent, or Firm* — Schwabe, Williamson & Wyatt, P.C.

(57) ABSTRACT

Embodiments of the present disclosure describe closed loop scheduled peak-to-average power (PAPR) reduction systems and methods to facilitate desired PAPR reduction. Other embodiments describe weighted tone reservation (WTR) methods and systems for PAPR reduction. Still other embodiments may be described and claimed.

19 Claims, 25 Drawing Sheets

OTHER PUBLICATIONS

Yin et al., "Weighted Tone Reservation for OFDM PAPR Reduction," U.S. Appl. No. 12/164,088, Jun. 29, 2008.

Yang et al., "Close Loop System Scheduled PAPR Reduction for TR Algorithm," U.S. Appl. No. 12/242,751, Sep. 30, 2008.

Office Action mailed Mar. 4, 2010 for U.S. Appl. No. 12/164,088.

Notice of Allowance mailed Jun. 21, 2010 for U.S. Appl. No. 12/164,088.

* cited by examiner

TONE RESERVATION TECHNIQUES FOR REDUCING PEAK-TO-AVERAGE POWER RATIOS

FIELD

Embodiments of the present disclosure relate to the field of wireless access networks, and more particularly, to tone reservation techniques for reducing peak to average power ratios in said wireless access networks.

BACKGROUND

Orthogonal frequency division multiple access (OFDMA) communications use an orthogonal frequency-division multiplexing (OFDM) digital modulation scheme to deliver information across broadband networks. OFDMA is particularly suitable for delivering information across wireless networks.

The OFDM digital modulation scheme uses a large number of closely-spaced orthogonal subcarriers to carry information. Each subcarrier is capable of carrying a data stream across a network between OFDMA terminals.

OFDMA-based communication systems are well known to have high peak-to-average power (PAPR) ratios. A high PAPR may reduce transmitter power amplifier (PA) power efficiency by increasing PA back off, which may reduce the uplink link budget. Therefore, it is desirable to control the PAPR for uplink transmission.

Tone reservation (TR) techniques provide one method of controlling PAPR in uplink transmissions. TR techniques reserve a set of subcarriers for PAPR reduction. The reserved subcarriers (or "tones") are not used for data transmission. Instead, when a signal has a high PAPR, a compensatory sequence is transmitted on the reserved tones to reduce the PAPR of the signal.

However, the TR approach is associated with PAPR regrowth issues, e.g., the complementary sequence, when added with the original sequence, may reduce the original peak, yet the newly generated peak may be added constructively at nonpeak locations. Therefore, multiple iterations may be required to achieve the desired PAPR level with added complexity. Furthermore, the conventional TR approach is associated with high power on the reserve tones.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
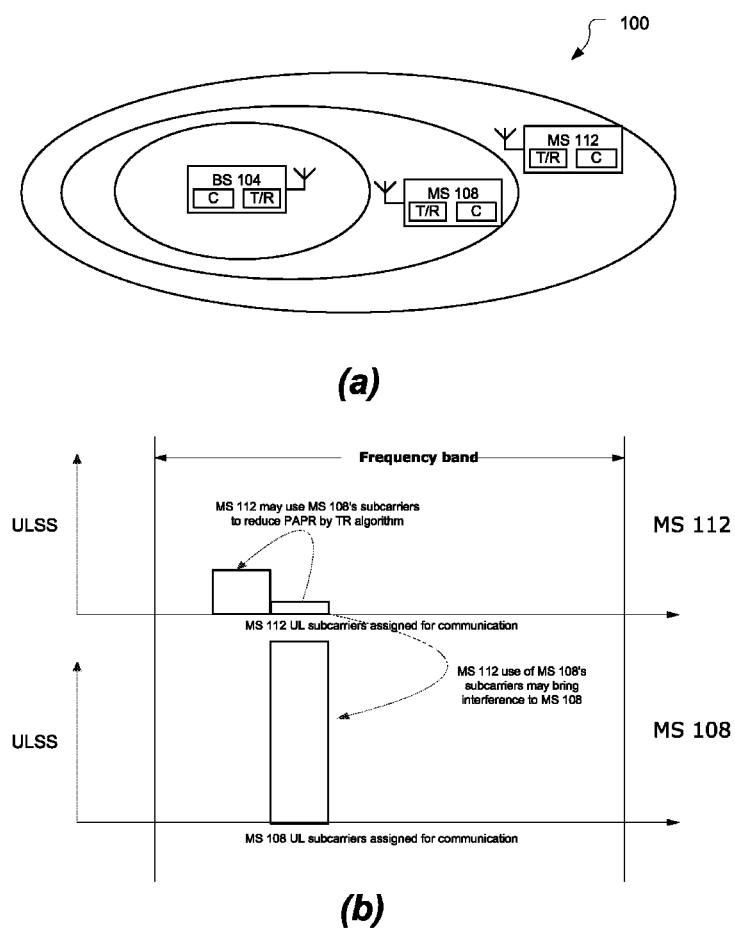
FIG. 1(a) illustrates an OFDMA wireless neighborhood in accordance with some embodiments.
FIG. 1(b) is a graph illustrating frequency versus uplink signal strength received at base station in accordance with some embodiments.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present disclosure describe closed loop scheduled PAPR reduction (CLSPR) systems and methods to facilitate desired PAPR reduction. Other embodiments describe weighted tone reservation (WTR) methods and systems for PAPR reduction. WTR may be used in conjunction with the CLSPR or they may be used independently. These methods and systems may be applied to OFDMA communications as presented in, e.g., the Institute of Electrical and Electronics Engineers (IEEE) 802.16-2004 standard along with any amendments, updates, and/or revisions (e.g., 802.16m, which is presently at pre-draft stage), $3^{rd}$ Generation Partnership Project (3GPP) long-term evolution (LTE) project, ultra mobile broadband (UMB) project (also referred to as "3GPP2"), etc.

FIG. 1(a) illustrates an OFDMA wireless neighborhood 100 in accordance with various embodiments. Shown in the wireless neighborhood 100 is a base station (BS) 104 in communication with a mobile station (MS) 108 and MS 112. FIG. 1(b) is a graph illustrating frequency versus uplink (UL) signal strength (ULSS) received at BS 104 in accordance with some embodiments. As can be seen, the ULSSs received at BS 104 may be very different. This difference may be the result of distance (path loss), propagation scenarios, fading, etc. Thus, it may be desirable for mobile stations with low ULSS, e.g., MS 112, to reduce PAPR and then increase UL signal power. However, the MS 108 may experience interference were the MS 112 to use MS 108's subcarriers to reduce PAPR through a TR algorithm. Accordingly, embodiments of the present disclosure provide a CLSPR method, as described in FIGS. 2 and 3, to manage the TR and PAPR reduction throughout the wireless neighborhood 100.

Each of the terminals of the wireless neighborhood 100 may include a controller (C) coupled to a transceiver front end (T/R). The controller may perform the operations discussed with respect to the corresponding terminal and control the transceiver front end for appropriate transmission and/or reception of the described communications.

FIGS. 2(a) and (b) are flowcharts depicting operations of the BS 104 and MS 108, respectively, to implement a CLSPR method in accordance with some embodiments. At block 204, the BS 104 may record historical information on received ULSS from mobile stations of the wireless neighborhood 100, e.g., MSs 108 and 112. The received ULSS may also be referred to as received signal strength (RSS). In some embodiments, the historical RSS information may be representative of ULSS received at the BS 104 from a particular mobile station over the entire communication period between the BS 104 and the particular mobile station. Other embodiments, taking into account the likelihood of changing signal strengths over time, e.g., due to the mobility of a particular station, the historical RSS information may be limited to a particular period determined to have relevant information.

At block 208, the BS 104 may determine an estimate of an RSS of an upcoming uplink transmission from mobile stations of the wireless neighborhood 100 based at least in part on the recorded historical RSS information. In some embodiments, the BS 104 may perform the estimate for each mobile station that will be allocated uplink resources in a given OFDMA frame, which may include both MS 108 and MS 112 in this embodiment.

At block 212, the BS 104 may determine a desired PAPR reduction for the mobile stations that will be allocated uplink resources for the given OFDMA frame.

At block 216, the BS 104 may determine PAPR reduction information (PRII) for the mobile stations that will be allocated uplink resources for the given OFDMA frame. PRII may include, among other things, an indication of a TR mode, e.g., as described in FIGS. 3 and 4 below, for each of the mobile stations to implement.

At block 220, the BS 104 may transmit the PRII to one or more mobile stations of the wireless neighborhood 100. In some embodiments, the transmission of the PRII may be done by broadcasting uplink scheduling information, e.g., in an UL resource map, to all of the mobile stations of the wireless neighborhood 100. The uplink scheduling information may include an indication of the data tones allocated to the mobile stations that intend to provide uplink transmissions in a given OFDMA frame.

At block 224, the MS 112 may receive the PRII included in the uplink scheduling information. In some embodiments, the PRII may have, in addition to the selected TR mode, an indication of the desired PAPR reduction for one or more of the mobile stations of the wireless neighborhood 100.

At block 228, the MS 112 may generate a data sequence and transmit the generated data sequence on the data tones assigned to the MS 108 by the uplink scheduling information.

At block 232, the MS 112 may also generate a PAPR sequence to implement a desired reduction in PAPR. The generated PAPR sequence may be transmitted on tones that are reserved according to the TR mode communicated in the uplink scheduling information.

Figure 3:
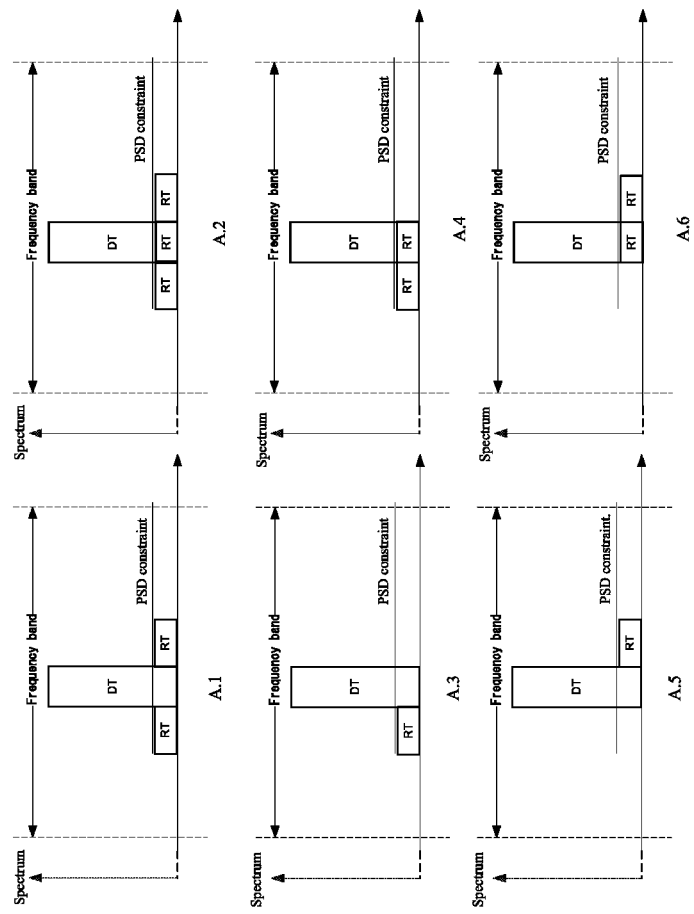
FIG. 3 illustrates various TR modes of a first usage model in accordance with embodiments of this disclosure.

The TR modes that may be implemented by the mobile stations may be divided into two usage models. The first usage model, which may be referred to as model A and is illustrated in FIG. 3 in accordance with some embodiments, may include the reservation of tones in a neighbor band. A neighbor band, as used herein, may refer to a group of tones that is adjacent to indicated data tones. The second usage model, which may be referred to as model B and is illustrated in FIG. 4 in accordance with some embodiments, may include only the reservation of an MS's own data tones for a PAPR sequence, e.g., self-distortion only.

Model A has six modes shown in FIG. 3. The first mode, A.1, may include reserved tones (RT) in each neighbor band without relying on self-distortion, e.g., none of the mobile station's own data tones (DT) are used as RT. It may be noted that the reserved tones are below the power spectrum density (PSD) constraint in order to avoid interference. The second mode, A.2, may include RT in each neighbor band and may also include self-distortion, e.g., utilizing some of the mobile station's own data tones as reserved tones. The third mode, A.3, may include reserved tones in only one neighbor band and may not include self-distortion. The fourth mode, A.4, may include reserved tones in only one neighbor band, similar to A.3, but may also rely on self-distortion. The fifth mode, A.5, may include reserved tones in only one neighbor band and may not include self-distortion. A.5 may be similar to A.3 but may use the opposite neighbor band. The sixth mode, A.6, may include reserved tones in only one neighbor band and rely on self-distortion. A.6 may be similar to A.4 but may use the opposite neighbor band.

The modes in which only one neighbor band is used, e.g., A.3-A.6, may be used when a resource allocation is towards the edge of the band or for any other cases in which only one side is available for reserved tones.

Figure 4:
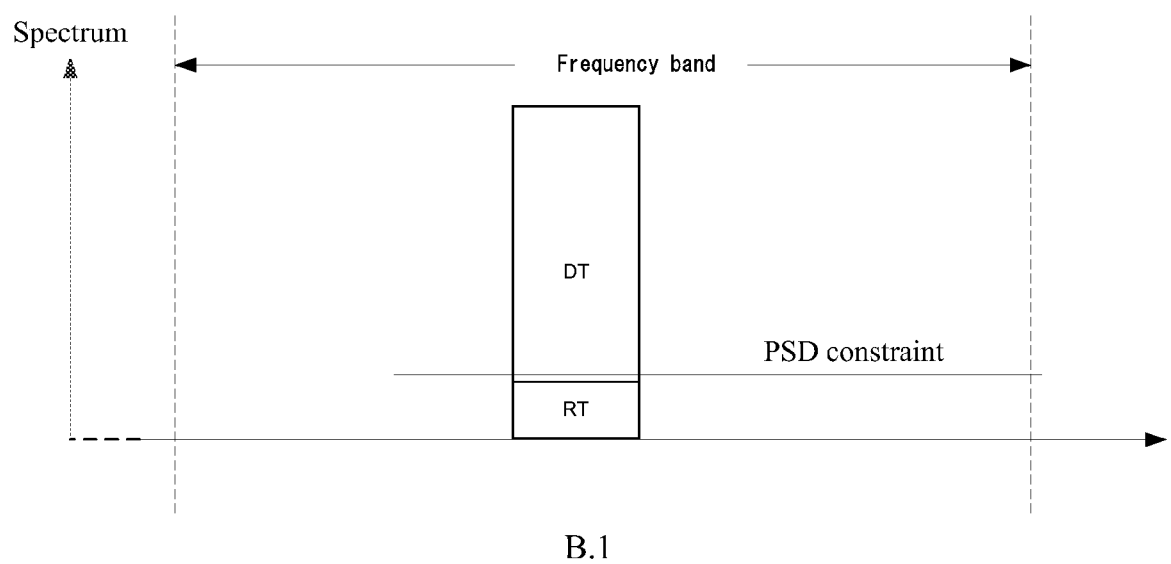
FIG. 4 illustrates a tone reservation mode of a second usage model in accordance with embodiments of this disclosure.

Model B may only have one mode, e.g., self-distortion only mode, which is shown in FIG. 4.

In some embodiments, the BS 104 may broadcast the TR mode to be used (or not) utilizing three bits as shown in Table 1. These bits may be transmitted in an UL map information element in accordance with some embodiments.

TABLE 1

| PRII Bits | Description |
|---|---|
| 000 | No PAPR reduction |
| 001 | A.1 Mode |
| 010 | A.2 Mode |
| 011 | A.3 Mode |
| 100 | A.4 Mode |
| 101 | A.5 Mode |
| 110 | A.6 Mode |
| 111 | B.1 Mode |

FIGS. 5-17 illustrate simulation results using the various modes of the usage models A and B in accordance with various embodiments.

Figure 5:
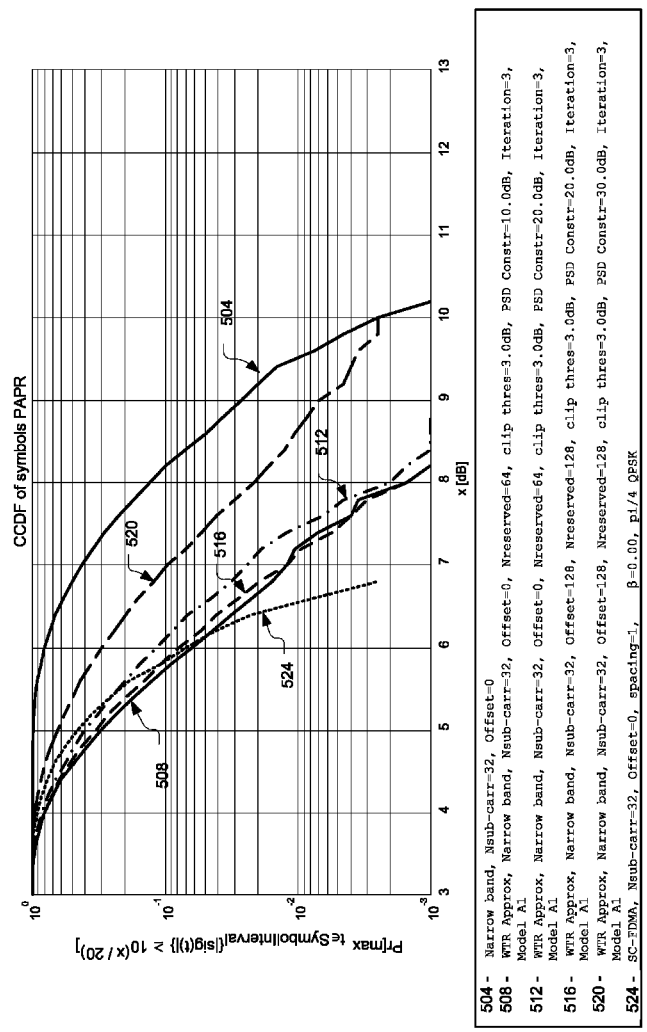
FIG. 5 illustrates a complementary cumulative distribution function (CCDF) of a symbol's PAPR as a function of decibels (dB) versus Pr in accordance with some embodiments.
Figure 6:
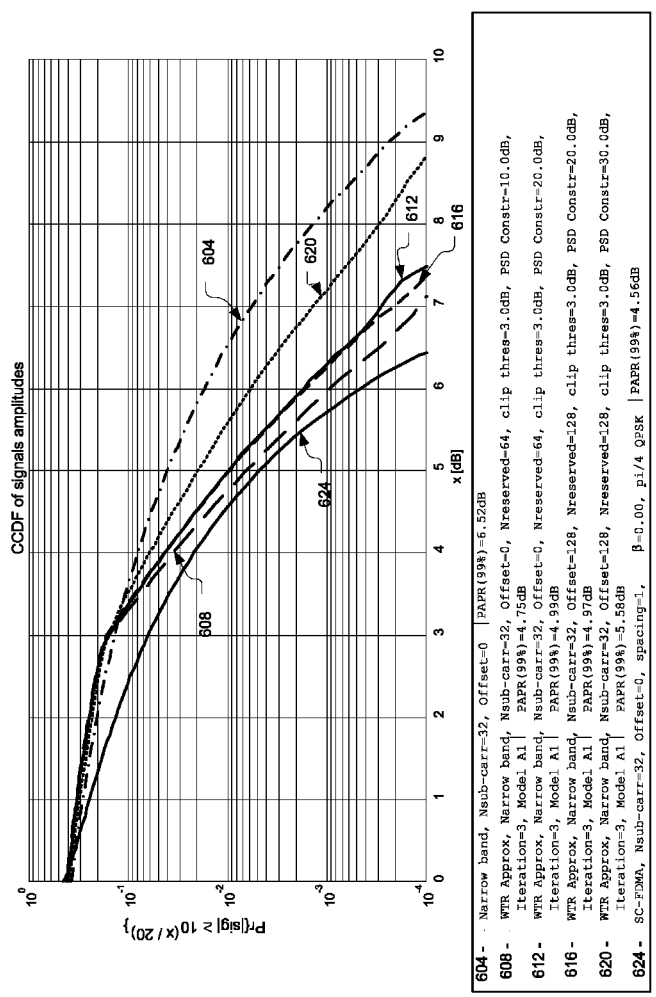
FIG. 6 illustrates a CCDF of signals' amplitudes as a function of dB versus Pr in accordance with some embodiments.

FIGS. 5-6 illustrate simulation results utilizing the A.1 mode with various PSD constraints and reserved tones bandwidth in accordance with some embodiments.

FIG. 5 illustrates a CCDF of a symbol's PAPR as a function of dB versus the given probability statement (Pr) in accordance with some embodiments.

Line 504 represents a narrowband signal with 32 subcarriers and 0 offset.

Line 508 represents a WTR approximation of a third iteration of a narrowband signal with 32 subcarriers, 0 offset, 64 reserved subcarriers, a clip threshold of 3.0 dB, a PSD constraint of 10.0 dB, and using the A.1 TR mode. WTR approximations will be discussed in further detail below, e.g., with respect to FIGS. 19-21.

Line 512 represents a WTR approximation of a third iteration of a narrowband signal with 32 subcarriers, 0 offset, 64 reserved subcarriers, a clip threshold of 3.0 dB, a PSD constraint of 20.0 dB, and using the A.1 TR mode.

Line 516 represents a WTR approximation of a third iteration of a narrowband signal with 32 subcarriers, 128 offset, 128 reserved subcarriers, a clip threshold of 3.0 dB, a PSD constraint of 20.0 dB, and using the A.1 TR mode.

Line 520 represents a WTR approximation of a third iteration of a narrowband signal with 32 subcarriers, 128 offset, 128 reserved subcarriers, a clip threshold of 3.0 dB, a PSD constraint of 30.0 dB, and using the A.1 TR mode.

Line 524 represents a single carrier (SC)-frequency division multiple access (FDMA) signal with 32 subcarriers, 0 offset, a spacing of 1, a raised-cosine shaping parameter ($\beta$) equal to 0, and pi/4 quadrature phase-shift keying (QPSK). Setting $\beta$ equal to 0 indicates that the raised-cosine shaping has been disabled thereby providing a raw SC-FDMA implementation.

FIG. 6 illustrates a CCDF of signals' amplitudes as a function of dB versus Pr in accordance with some embodiments.

Line 604 represents a narrowband signal with 32 subcarriers and 0 offset. The signal may have a 99% PAPR equal to 6.52 dB.

Line 608 represents a WTR approximation of a third iteration of a narrowband signal with 32 subcarriers, 0 offset, 64 reserved subcarriers, a clip threshold of 3.0 dB, a PSD constraint of 10.0 dB, and using the A.1 TR mode. The signal may have a 99% PAPR equal to 4.75 dB.

Line 612 represents a WTR approximation of a third iteration of a narrowband signal with 32 subcarriers, 0 offset, 64 reserved subcarriers, a clip threshold of 3.0 dB, a PSD constraint of 20.0 dB, and using the A.1 mode for TR. The signal may have a 99% PAPR equal to 4.99 dB.

Line 616 represents a WTR approximation of a third iteration of a narrowband signal with 32 subcarriers, 128 offset, 128 reserved subcarriers, a clip threshold of 3.0 dB, a PSD constraint of 20.0 dB, and using the A.1 TR mode. The signal may have a 99% PAPR equal to 4.97 dB.

Line 620 represents a WTR approximation of a third iteration of a narrowband signal with 32 subcarriers, 128 offset, 128 reserved subcarriers, a clip threshold of 3.0 dB, a PSD constraint of 30.0 dB, and using the A.1 mode for TR. The signal may have a 99% PAPR equal to 5.58 dB.

Figure 7:
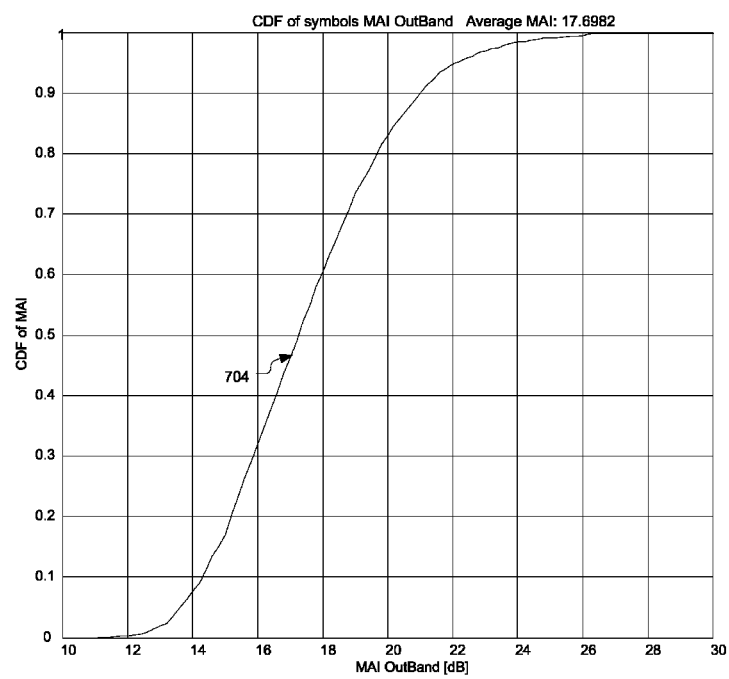
FIG. 7 is a graph plotting a weighted tone reservation (WTR) approximation as a function of cumulative distribution function (CDF) of multiple access interference (MAI) versus the amount of MAI out of band in accordance with some embodiments.

Line 624 represents a SC-FDMA signal with 32 subcarriers, 0 offset, a spacing of 1, $\beta$ equal to 0, and pi/4 QPSK. The signal may have a 99% PAPR equal to 4.56 dB FIG. 7 is a graph plotting a WTR approximation as a function of CDF of MAI versus the amount, in dB, of MAI out of band in accordance with some embodiments.

Line 704 represents a WTR approximation of a third iteration of a narrowband signal with 32 subcarriers, an offset of 0, 64 reserved subcarriers, a clip threshold of 3.0 dB, a PSD constraint of 10 dB, and using the A.1 TR mode. The average MAI may be equal to 17.6982.

Figure 8:
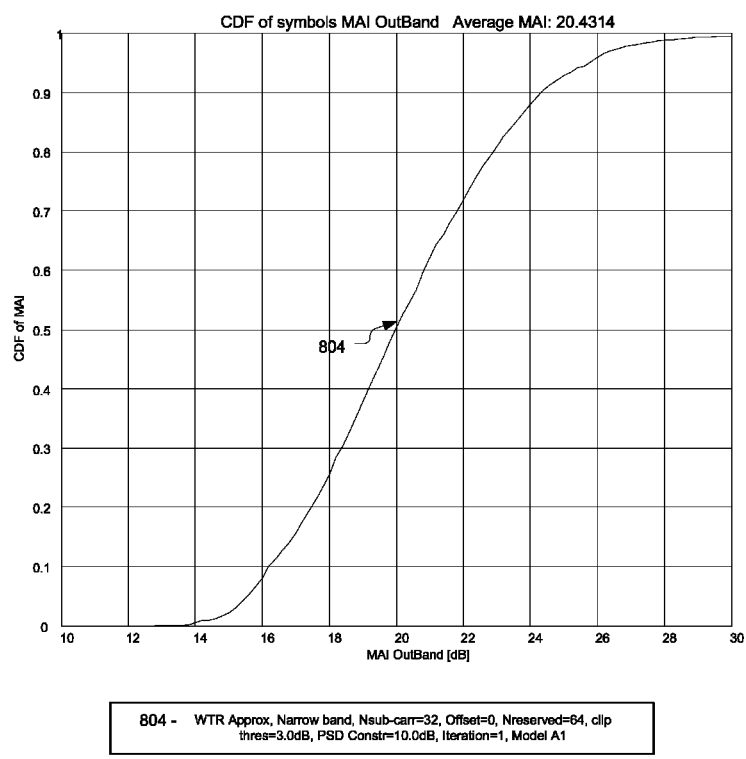
FIG. 8 is a graph plotting another WTR approximation as a function of CDF of MAI versus the amount of MAI out of band in accordance with some embodiments.

FIG. 8 is a graph plotting another WTR approximation as a function of CDF of MAI versus the amount, in dB, of MAI out of band in accordance with some embodiments.

Line 804 represents a WTR approximation of a first iteration of a narrowband signal with 32 subcarriers, an offset of 0, 64 reserved subcarriers, a clip threshold of 3.0 dB, a PSD constraint of 10 dB, and using the A.1 TR mode for TR. The average MAI may be equal to 20.4314.

From the simulation results presented in FIGS. 5-8, we may draw the following conclusions: when the PSD constraint is at 20 dB, the PAPR/signal CCDFs may be close to SC-FDMA; when the PSD constraint is at 20 dB and the reserved tones number increases from 64 to 128, the performance remains similar; when the PSD constraint is at 30 dB, the PAPR reduction is half of SC-FDMA, comparing to a narrowband OFDMA; and at 10 dB PSD constraints, the MAI is small, e.g., 20.4 dB for iteration 1 (FIG. 8) and 17.7 dB for iteration 3 (FIG. 7).

Figure 9:
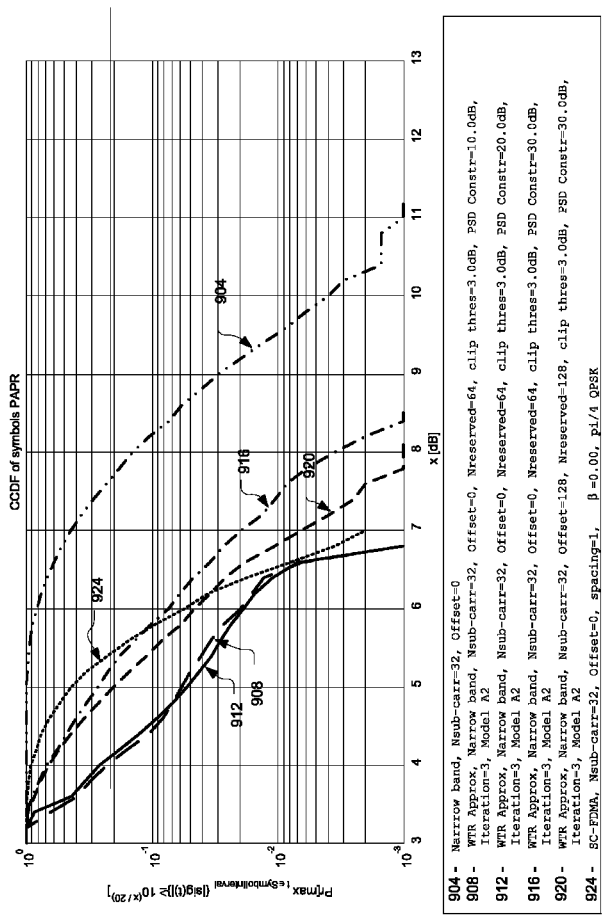
FIG. 9 illustrates a CCDF of a symbol's PAPR as a function of dB versus Pr in accordance with some embodiments.
Figure 10:
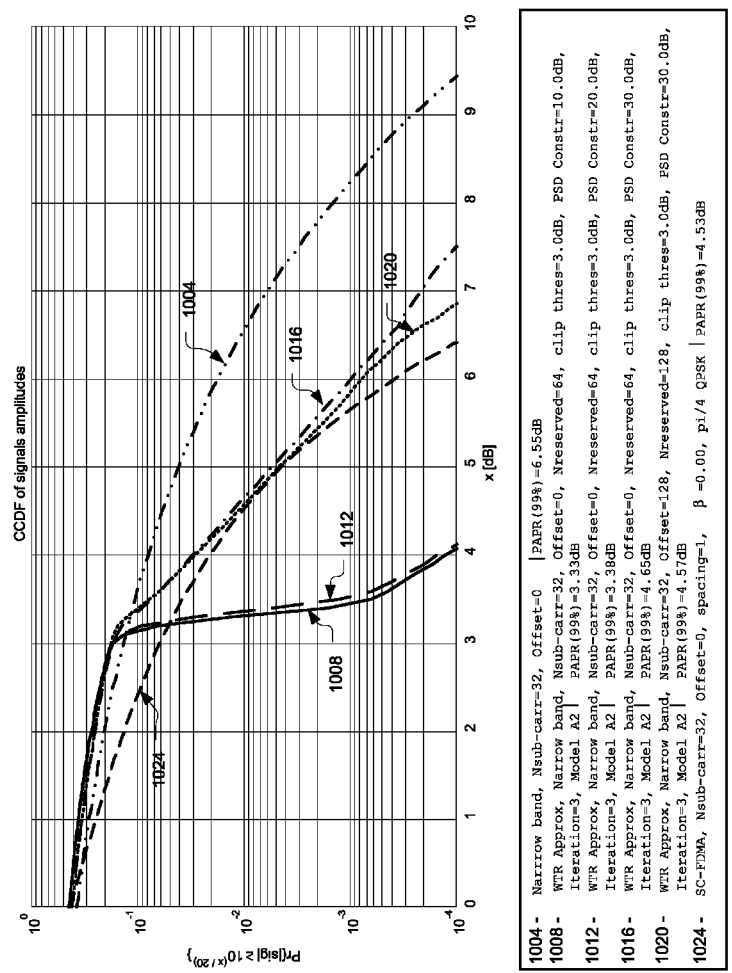
FIG. 10 illustrates a CCDF of signals' amplitudes as a function of dB versus Pr in accordance with some embodiments.

FIGS. 9-10 illustrate simulation results utilizing the A.2 mode for TR with various PSD constraints and reserved tones bandwidth in accordance with some embodiments.

FIG. 9 illustrates a CCDF of a symbol's PAPR as a function of dB versus Pr in accordance with some embodiments.

Line 904 represents a narrowband signal with 32 subcarriers and 0 offset.

Line 908 represents a WTR approximation of a third iteration of a narrowband signal with 32 subcarriers, 0 offset, 64 reserved subcarriers, a clip threshold of 3.0 dB, a PSD constraint of 10.0 dB, and using the A.2 TR mode.

Line 912 represents a WTR approximation of a third iteration of a narrowband signal with 32 subcarriers, 0 offset, 64 reserved subcarriers, a clip threshold of 3.0 dB, a PSD constraint of 20.0 dB, and using the A.2 TR mode.

Line 916 represents a WTR approximation of a third iteration of a narrowband signal with 32 subcarriers, 0 offset, 64 reserved subcarriers, a clip threshold of 3.0 dB, a PSD constraint of 30.0 dB, and using the A.2 TR mode.

Line 920 represents a WTR approximation of a third iteration of a narrowband signal with 32 subcarriers, 128 offset, 128 reserved subcarriers, a clip threshold of 3.0 dB, a PSD constraint of 30.0 dB, and using the A.2 mode for TR.

Line 924 represents an SC-FDMA signal with 32 subcarriers, 0 offset, a spacing of 1, β equal to 0, and a pi/4 QPSK.

FIG. 10 illustrates a CCDF of signals' amplitudes as a function of dB versus Pr in accordance with some embodiments.

Line 1004 represents a narrowband signal with 32 subcarriers and 0 offset. The signal may have a 99% PAPR equal to 6.55 dB.

Line 1008 represents a WTR approximation of a third iteration of a narrowband signal with 32 subcarriers, 0 offset, 64 reserved subcarriers, a clip threshold of 3.0 dB, a PSD constraint of 10.0 dB, and using the A.2 TR mode. The signal may have a 99% PAPR equal to 3.33 dB.

Line 1012 represents a WTR approximation of a third iteration of a narrowband signal with 32 subcarriers, 0 offset, 64 reserved subcarriers, a clip threshold of 3.0 dB, a PSD constraint of 20.0 dB, and using the A.2 TR mode. The signal may have a 99% PAPR equal to 3.38 dB.

Line 1016 represents a WTR approximation of a third iteration of a narrowband signal with 32 subcarriers, 0 offset, 64 reserved subcarriers, a clip threshold of 3.0 dB, a PSD constraint of 30.0 dB, and using the A.2 TR mode. The signal may have a 99% PAPR equal to 4.65 dB.

Line 1020 represents a WTR approximation of a third iteration of a narrowband signal with 32 subcarriers, 128 offset, 128 reserved subcarriers, a clip threshold of 3.0 dB, a PSD constraint of 30.0 dB, and using the A.2 TR mode. The signal may have a 99% PAPR equal to 4.57 dB.

Line 1024 represents a SC-FDMA signal with 32 subcarriers, 0 offset, a spacing of 1, β equal to 0, and pi/4 QPSK. The signal may have a 99% PAPR equal to 4.53 dB.

Figure 11:
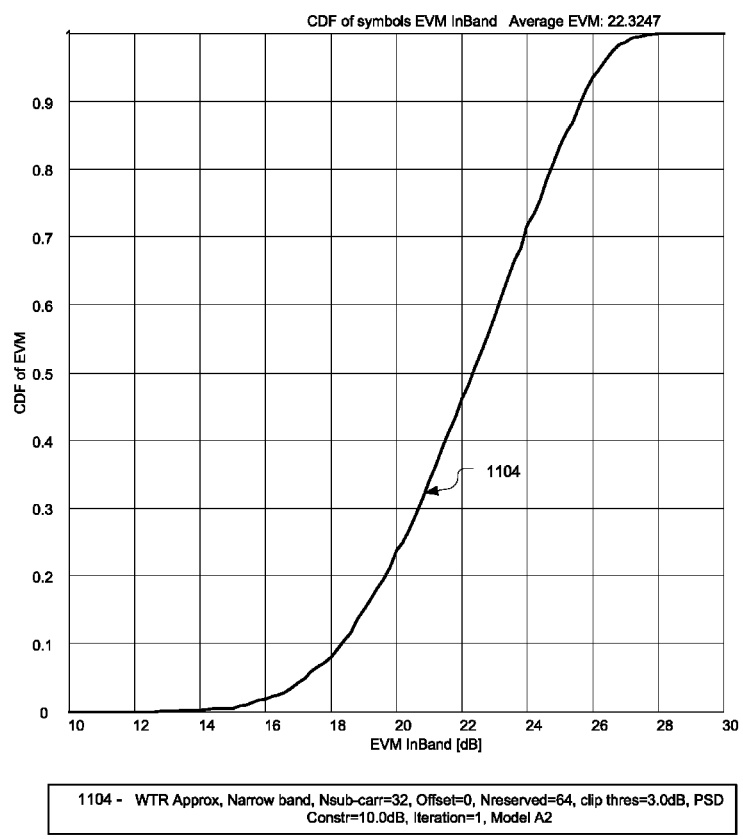
FIG. 11 is a graph plotting a CDF of error vector magnitude (EVM) versus the amount of EVM in band in accordance with some embodiments.

FIG. 11 is a graph plotting a CDF of error vector magnitude (EVM) versus the amount, in dB, of EVM in band in accordance with some embodiments.

Line 1104 represents a WTR approximation of a first iteration of a narrowband signal with 32 subcarriers, an offset of 0, 64 reserved subcarriers, a clip threshold of 3.0 dB, a PSD constraint of 10 dB, and using the A.2 TR mode. The average EVM may be equal to 22.3247.

Figure 12:
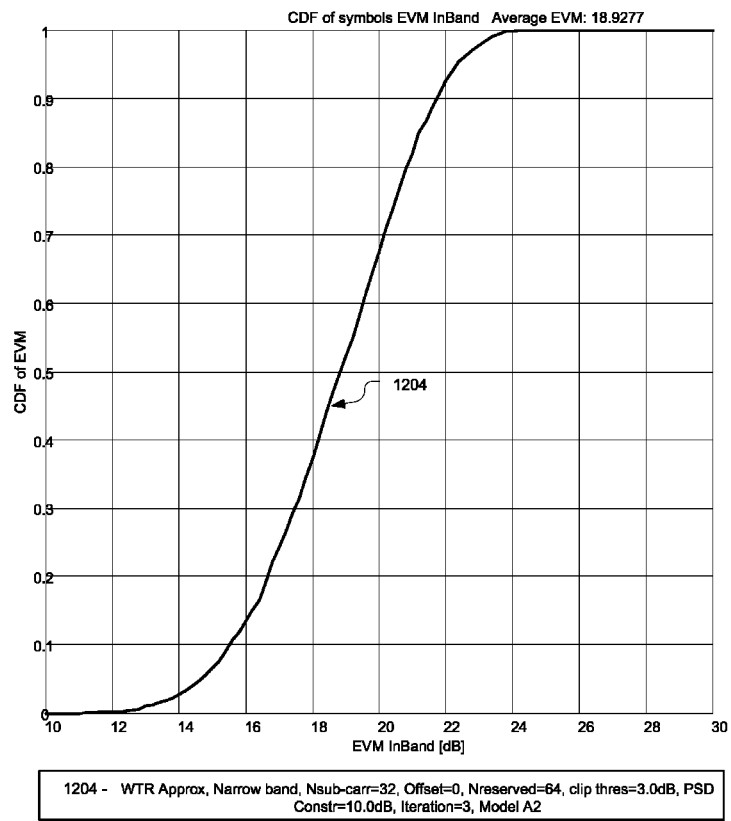
FIG. 12 is a graph plotting a CDF of EVM versus the amount of EVM in band in accordance with some embodiments.

FIG. 12 is a graph plotting a CDF of EVM versus the amount, in dB, of EVM in band in accordance with some embodiments.

Line 1204 represents a WTR approximation of a third iteration of a narrowband signal with 32 subcarriers, an offset of 0, 64 reserved subcarriers, a clip threshold of 3.0 dB, a PSD constraint of 10 dB, and using the A.2 TR mode. The average EVM may be equal to 18.9277.

Figure 13:
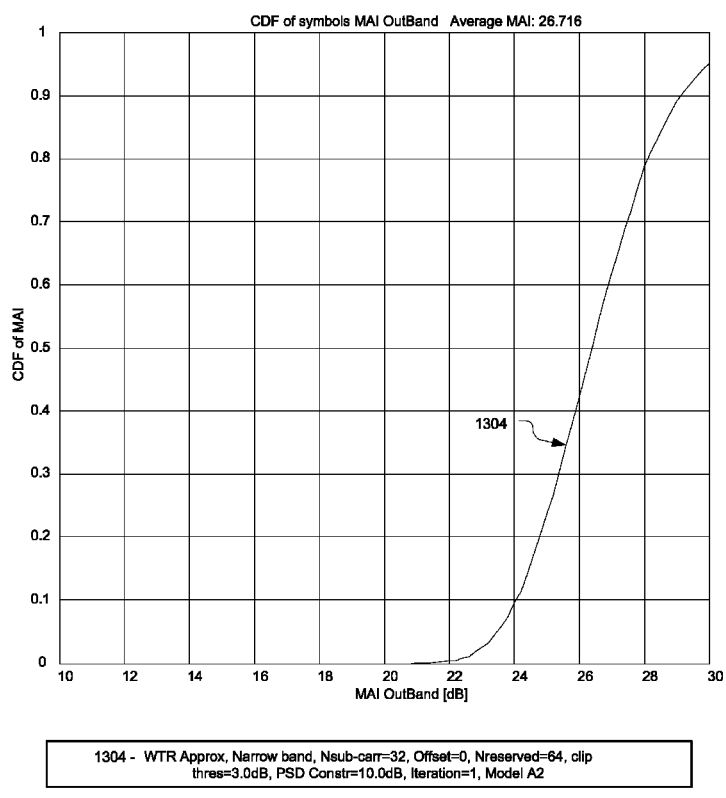
FIG. 13 is a graph plotting a CDF of MAI versus the amount of MAI out of band in accordance with some embodiments.

FIG. 13 is a graph plotting a CDF of MAI versus the amount, in dB, of MAI out of band in accordance with some embodiments.

Line 1304 represents a WTR approximation of a first iteration of a narrowband signal with 32 subcarriers, an offset of 0, 64 reserved subcarriers, a clip threshold of 3.0 dB, a PSD constraint of 10 dB and using the A.2 TR mode. The average MAI may be equal to 26.716.

Figure 14:
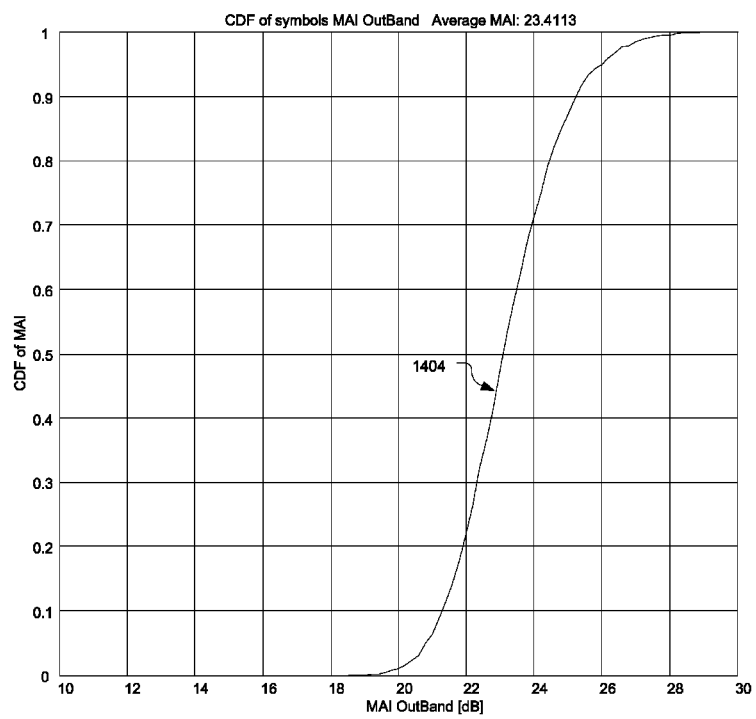
FIG. 14 is a graph plotting a CDF of MAI versus the amount of MAI out of band in accordance with some embodiments.

FIG. 14 is a graph plotting a CDF of MAI versus the amount, in dB, of MAI out of band in accordance with some embodiments.

Line 1404 represents a WTR approximation of a third iteration of a narrowband signal with 32 subcarriers, an offset of 0, 64 reserved subcarriers, a clip threshold of 3.0 dB, a PSD constraint of 10 dB and using the A.2 TR mode. The average MAI may be equal to 23.4113.

From the simulation results presented in FIGS. 9-14, we may draw the following conclusions: when the PSD constraint is at 10 and 20 dB, the PAPR/Signal CCDF is better than the SC-FDMA (~1.2 dB); when the PSD constraint is at 30 dB, PAPR/Signal CCDF is similar to the SC-FDMA; performance is very similar for reserved tones 64 and 128; and the A.2 TR mode is generally better than SC-FDMA for PAPR, however, self-distortion loss is 18 dB (EVM) for a 10 dB PSD constraint.

Figure 15:
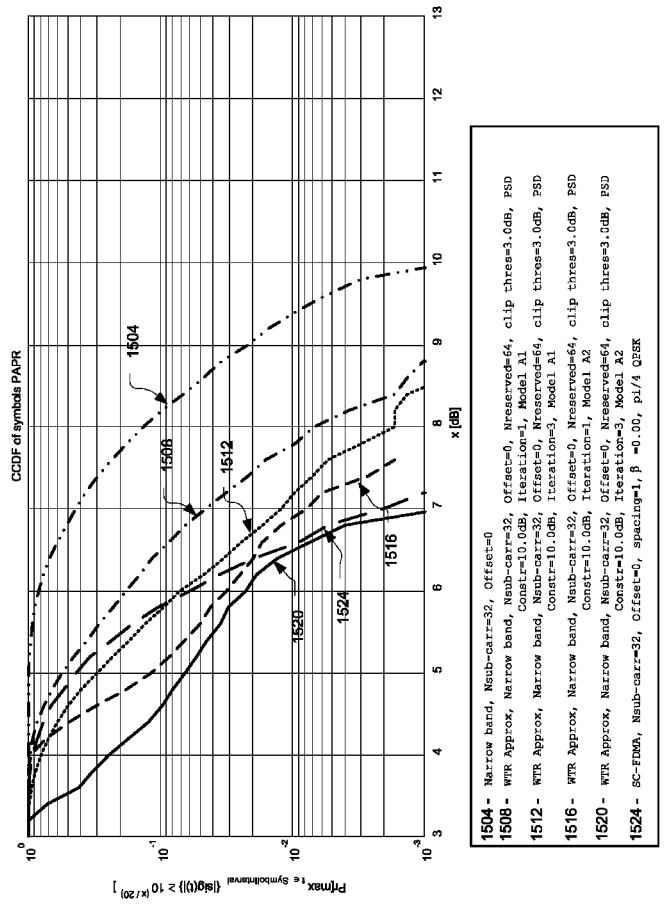
FIG. 15 illustrates a CCDF of a symbol's PAPR of various TR modes in accordance with some embodiments.

FIG. 15 illustrates a CCDF of a symbol's PAPR of A.1 and A.2 TR modes with 10 dB PSD Constraints and 64 reserved tones in accordance with some embodiments.

Line 1504 represents a narrowband signal with 32 subcarriers and 0 offset.

Line 1508 represents a WTR approximation of a first iteration of a narrowband signal with 32 subcarriers, 0 offset, 64 reserved subcarriers, a clip threshold of 3.0 dB, a PSD constraint of 10.0 dB, and using the A.1 TR mode.

Line 1512 represents a WTR approximation of a third iteration of a narrowband signal with 32 subcarriers, 0 offset, 64 reserved subcarriers, a clip threshold of 3.0 dB, a PSD constraint of 20.0 dB, and using the A.1 TR mode.

Line 1516 represents a WTR approximation of a first iteration of a narrowband signal with 32 subcarriers, 0 offset, 64 reserved subcarriers, a clip threshold of 3.0 dB, a PSD constraint of 10.0 dB, and using the A.2 TR mode.

Line 1520 represents a WTR approximation of a third iteration of a narrowband signal with 32 subcarriers, 0 offset, 64 reserved subcarriers, a clip threshold of 3.0 dB, a PSD constraint of 10.0 dB, and using the A.2 TR mode.

Line 1524 represents an SC-FDMA signal with 32 subcarriers, 0 offset, a spacing of 1, β equal to 0, and a pi/4 QPSK.

Figure 16:
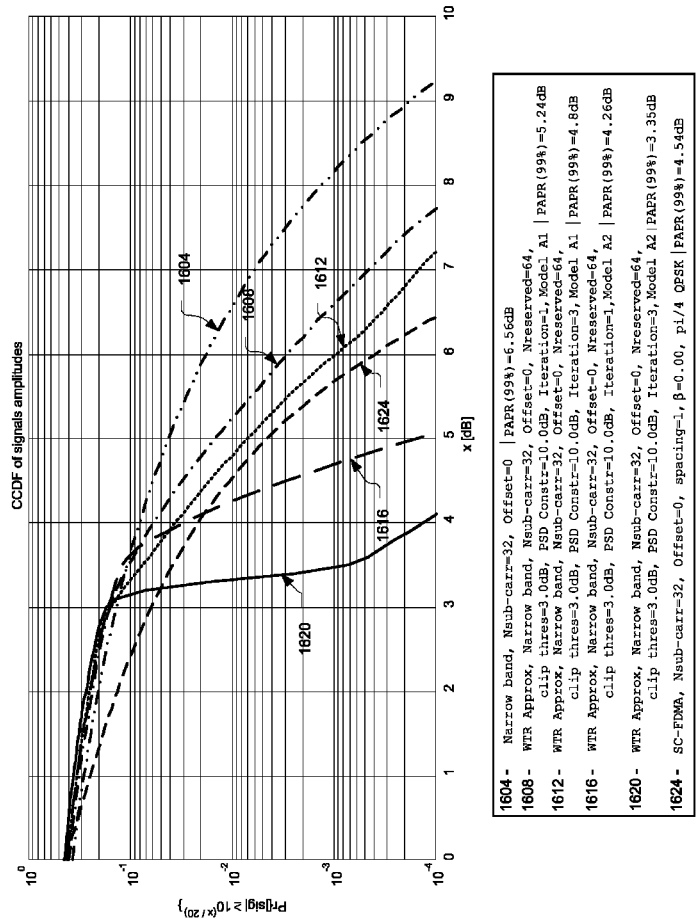
FIG. 16 illustrates a CCDF of signals' amplitudes of various TR modes in accordance with some embodiments.

FIG. 16 illustrates a CCDF of signals' amplitudes of A.1 and A.2 TR modes with 10 dB PSD Constraints and 64 reserved tones in accordance with some embodiments.

Line 1604 represents a narrowband signal with 32 subcarriers and 0 offset. The signal may have a 99% PAPR equal to 6.55 dB.

Line 1608 represents a WTR approximation of a first iteration of a narrowband signal with 32 subcarriers, 0 offset, 64 reserved subcarriers, a clip threshold of 3.0 dB, a PSD constraint of 10.0 dB, and using the A.1 TR mode. The signal may have a 99% PAPR equal to 5.24 dB.

Line 1612 represents a WTR approximation of a third iteration of a narrowband signal with 32 subcarriers, 0 offset, 64 reserved subcarriers, a clip threshold of 3.0 dB, a PSD constraint of 10.0 dB, and using the A.1 TR mode. The signal may have a 99% PAPR equal to 4.8 dB.

Line 1616 represents a WTR approximation of a first iteration of a narrowband signal with 32 subcarriers, 0 offset, 64 reserved subcarriers, a clip threshold of 3.0 dB, a PSD constraint of 10.0 dB, and using the A.2 TR mode. The signal may have a 99% PAPR equal to 4.26 dB.

Line 1620 represents a WTR approximation of a third iteration of a narrowband signal with 32 subcarriers, 0 offset, 64 reserved subcarriers, a clip threshold of 3.0 dB, a PSD constraint of 10.0 dB, and using the A.2 TR mode. The signal may have a 99% PAPR equal to 3.35 dB.

Line 1624 represents a SC-FDMA signal with 32 subcarriers, 0 offset, a spacing of 1, β equal to 0, and pi/4 QPSK. The signal may have a 99% PAPR equal to 4.54 dB.

Figure 17:
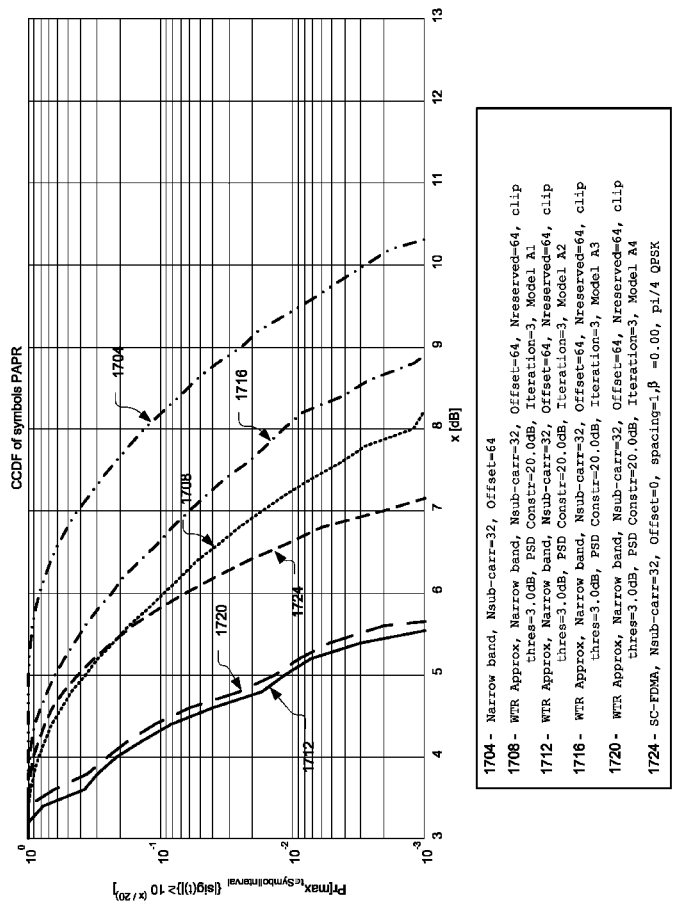
FIG. 17 illustrates a CCDF of a symbol's PAPR of various TR modes in accordance with some embodiments.

FIG. 17 illustrates a CCDF of a symbol's PAPR of A.1-A.4 TR modes in accordance with some embodiments.

Line 1704 represents a narrowband signal with 32 subcarriers and 64 offset.

Line 1708 represents a WTR approximation of a third iteration of a narrowband signal with 32 subcarriers, 64 offset, 64 reserved subcarriers, a clip threshold of 3.0 dB, a PSD constraint of 20.0 dB, and using the A.1 TR mode.

Line 1712 represents a WTR approximation of a third iteration of a narrowband signal with 32 subcarriers, 64 offset, 64 reserved subcarriers, a clip threshold of 3.0 dB, a PSD constraint of 20.0 dB, and using the A.2 TR mode.

Line 1716 represents a WTR approximation of a third iteration of a narrowband signal with 32 subcarriers, 64 offset, 64 reserved subcarriers, a clip threshold of 3.0 dB, a PSD constraint of 20.0 dB, and using the A.3 TR mode.

Line 1720 represents a WTR approximation of a third iteration of a narrowband signal with 32 subcarriers, 64 offset, 64 reserved subcarriers, a clip threshold of 3.0 dB, a PSD constraint of 20.0 dB, and using the A.4 TR mode.

Line 1724 represents an SC-FDMA signal with 32 subcarriers, 0 offset, a spacing of 1, β equal to 0, and a pi/4 QPSK.

As can be seen from FIGS. 16 and 17, the self-distortion of the A.2 TR mode may allow further reductions of PAPR as compared to the no self-distortion of the A.1 TR mode. Furthermore, as can be seen from the comparisons presented in FIG. 17, using only one side of reserved tones (A.3-A.4 TR modes) can get similar PAPR reduction results as using both sides (A.1-A.2 TR modes).

Figure 2:
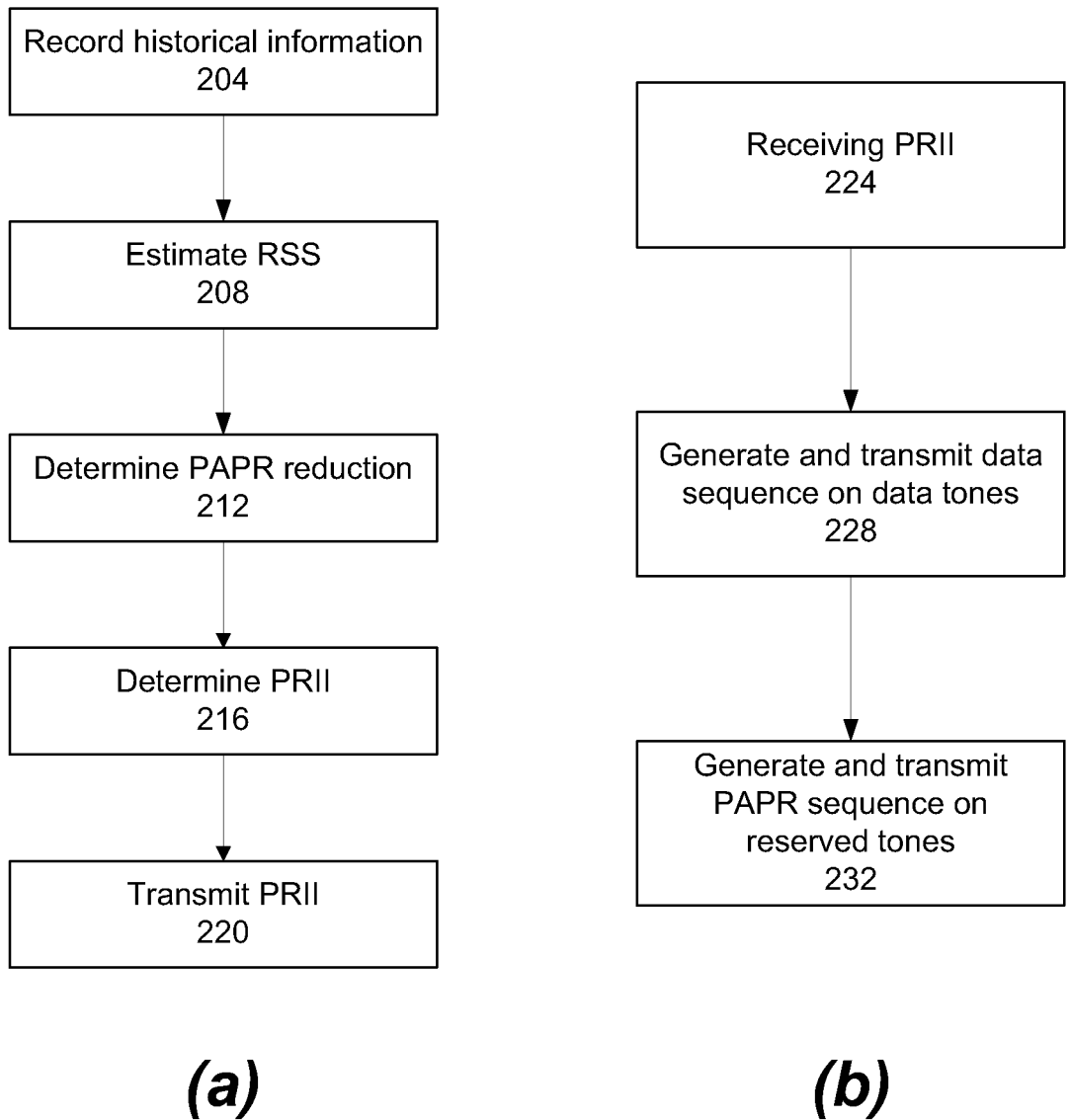
FIGS. 2(a) and (b) are flowcharts depicting operations of the base station and mobile station, respectively, to implement closed loop scheduled PAPR reduction in accordance with some embodiments.
Figure 18:
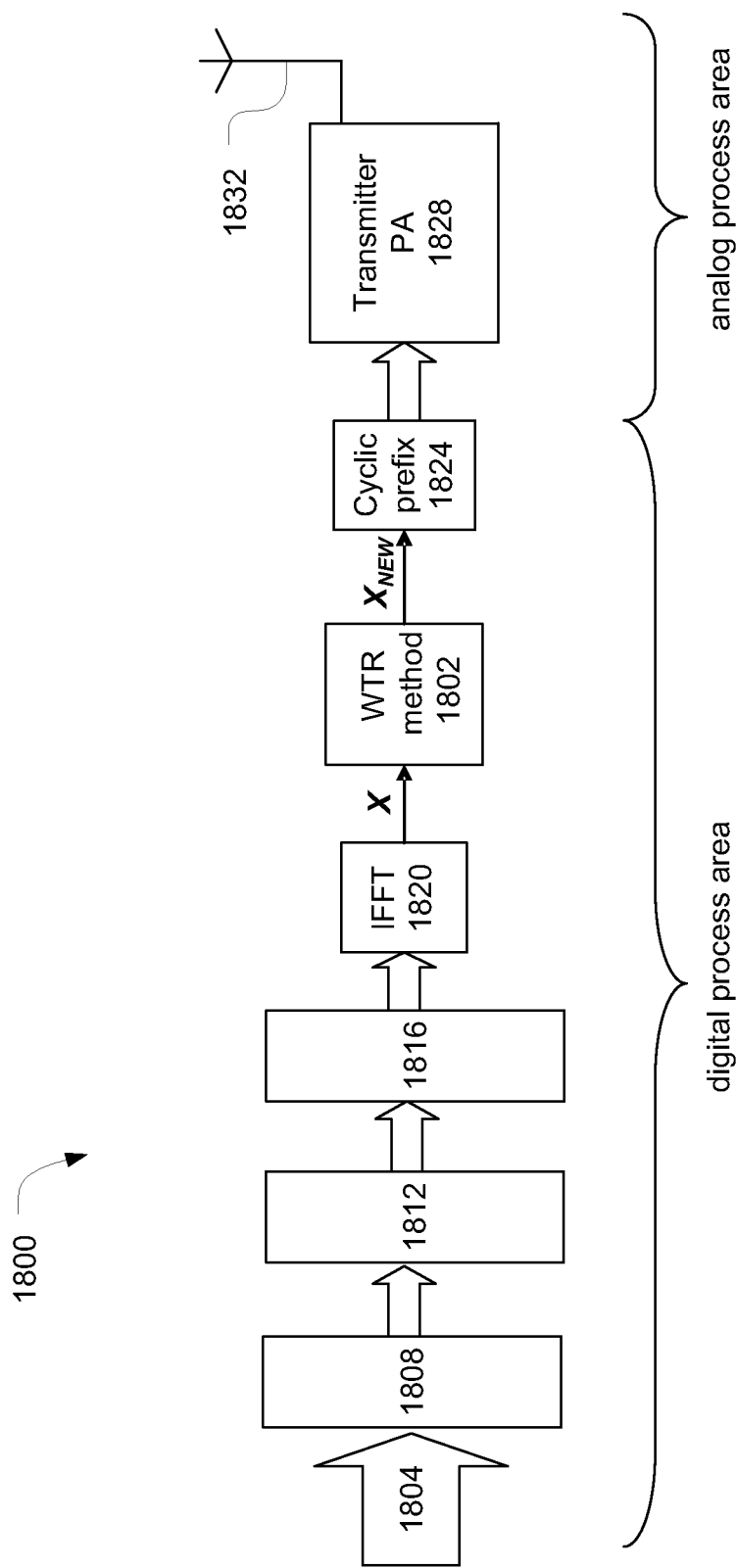
FIG. 18 is a block diagram of an OFDMA communication system using a weighted tone reservation (WTR) method according to some embodiments.

In some embodiments, the stations of the wireless neighborhood 100 may implement a WTR method in the reservation of tones. The WTR method may use, e.g., a WTR approximation process, referenced above, or a WTR simplification process. These processes will be explained in further detail below. FIG. 18 is a block diagram of an OFDMA communication system 1800 using a WTR method 1802, according to some embodiments. The OFDMA communication system 1800 may operate in a transmitter (as shown) or in a receiver, such as in a base station 104 or mobile station 108 of the wireless neighborhood 100. The OFDMA communication system 1800 receives binary input data 1804 into a randomizer 1808, an encoder 1812, and an interleaver 1816. The binary data is then processed by an inverse fast Fourier transform (IFFT) 1820, to generate an original data sequence, X. The WTR method 1802 is executed on the sequence, producing a new sequence, $X_{NEW}$, which is then fed into the cyclic prefix processor 1824, thus completing the digital processing. The transmit power amplifier (PA) 1828 and the antenna 1832 make up the analog process area of the OFDMA communication system 1800. FIG. 1 is merely illustrative of some modules of the OFDMA communication system 1800, as many modules are not described herein for simplicity.

In some embodiments, the WTR method 1802 uses the following principles in its operation. Assume an original data sequence, X, and a complementary PAPR sequence, $X_C$. To provide a PAPR reduction, the WTR method 1802 wants to ensure that:

$$\max|X+X_c| < \max|X|. \tag{1}$$

Most existing TR algorithms focus on canceling existing peaks. However, simply canceling peaks may cause peak regrowth issues as discussed above.

The WTR method 1802 may perform a weighted quadratic peak reduction in accordance with some embodiments. First, the WTR method 1802 takes the amplitude profile, |X|, of the sequence, X When canceling the peaks, the WTR method 1802 may also pay attention to the potential peak regrowth. Observe that if $|X(n)| \ll \max|X|$, then the chance of X(n) becoming a new peak is small. On the other hand, if $|X(n)| \approx \max|X|$, then, very likely, X(n) will become a new peak. Therefore, in some embodiments, the WTR method 1802 applies some weight or cost constraint, according to |X|, when generating $X_C$ to reduce the PAPR of the communications system.

By setting a PAPR target, $PAPR_0$, the WTR method 1802 finds the time domain, clipped signal, $X_p$, to satisfy the following equation:

$$PAPR(X-Xp)=PAPR_0 \tag{2}$$

by clipping. Now, instead of directly subtracting the clipped signal Xp, the WTR method 1802 generates a similar signal by transmitting a sequence, C, in the reserved tones as signal $X_c$. The sequence, C, is generated using the following criteria:

$$C = \underset{C}{\mathrm{argmin}} D^T |X_p - AC|^2 \tag{3}$$

where A is the inverse fast Fourier transform (IFFT) matrix of sequence, C, and D is a weighted function.

In some embodiments, the WTR method 1802 may calculate C by taking an inverse matrix of M by M, as follows:

$$Ct_M = (A_{N\times M}{}^H W_{N\times N} A_{N\times M})^{-1} A_{N\times M}{}^H W_{N\times N} X_p, \tag{4}$$

where $A_{N\times M}$ is an N by M matrix selected from IFFT transform matrix A, by reserved tone index at C. H is a conjugate transpose where $A^H=(A')^*$, A' is a transpose of matrix A, A* is a conjugate complex of matrix A.

$Ct_M$ is a length M vector, from $C_t$ to C is $$C_j = \left\{ \begin{array}{ll} = Ct_k & j \in \{t_k\} \\ = 0 & j \notin \{t_k\} \end{array} \right\} \tag{5}$$

$$k = 1 \sim M, 1 \le t_k \le N, j = 0 \sim N$$

The weighted function, D, may be defined as, $D=(|X|^2)$, and the WTR method 1802 may obtain the weighted array, W, as follows:

$$W = \begin{pmatrix} D_1 & 0 & \ldots & \ldots & 0 \\ 0 & \ldots & 0 & \ldots & \ldots \\ \ldots & 0 & D_i & 0 & \ldots \\ \ldots & \ldots & 0 & \ldots & 0 \\ 0 & \ldots & \ldots & 0 & D_N \end{pmatrix}_{N \times N} \tag{6}$$

According to equation (4), when the size of M increases, the computation complexity may make it difficult for real-time implementation. Thus, the WTR method 1802 may directly calculate the sequence, C, only when the number of reserved tones is less than a threshold value. In other embodiments, the WRT method 1802 may use approximation and/or simplification processes that do not require computation of the matrix inverse.

The first approximation process that may be employed by the WTR method 1802 may be based on the theory of generalized inverse matrix.

Let $B_{M \times M}$ be defined as:

$$B_{M \times M} = A_{N \times M}{}^H W_{N \times N} A_{N \times M} \tag{7}$$

Based on the theory of generalized inverse matrix, we have $$\begin{aligned} B_{M \times M}^{-1} &= B_{M \times M}^+ \\ &= (A_{N \times M}^H W_{N \times N} A_{N \times M})^+ \\ &\approx (A_{N \times M})^+ (W_{N \times N})^+ (A_{N \times M}^H)^+ \end{aligned} \tag{8}$$

Because $$A_{N \times M}{}^H A_{N \times M} = I_{N \times N} \tag{9}$$

so $$(A_{N \times M})^+ = A_{N \times M}{}^H$$

$$(A_{N \times M})^+ = A_{N \times M} \tag{10}$$

By using equations (10), equation (8) may be expressed as:

$$B_{M \times M}{}^{-1} \approx A_{N \times M}{}^H W_{N \times N}{}^{-1} A_{N \times M}. \tag{11}$$

With K defined as:

$$K_{N \times N} = W_{N \times N}^{-1} = \begin{Bmatrix} \frac{1}{D_1} & 0 & \cdots & \cdots & 0 \\ 0 & \cdots & 0 & \cdots & \cdots \\ \cdots & 0 & \frac{1}{D_i} & 0 & \cdots \\ \cdots & \cdots & 0 & \cdots & 0 \\ 0 & \cdots & \cdots & 0 & \frac{1}{D_N} \end{Bmatrix}_{N \times N} \tag{12}$$

$Ct_M$ may be provided by:

$$Ct_M \approx A_{N \times M}{}^H \times K_{N \times N} \times A_{N \times M} \times A_{N \times M}{}^H \times W_{N \times N} \times X_p. \tag{13}$$

At equation (4), we can set weighted function D as defined above, e.g., $D=(|X|^2)$. However, in this approximation, we may generate matrix K, and some points of $(|X|^2)$ may be zero. To ensure that the denominator is not zero, the modified weighted function, D, may be set as:

$$D=(|X|^2)+\alpha \times E(|X|^2), \tag{14}$$

where $\alpha$ is a constant that can be set at a value at or between 0.1~1.5. The exact value of $\alpha$ may be set according to implementation details of specific embodiments.

After comparing results from equation (13) and equation (4), with the matrix inverse formula without approximation, one additional modified factor, $\delta$, may be added to equation (13) as follows:

$$Ct_M \approx \delta \times (A_{N \times M}{}^H \times K_{N \times N} \times A_{N \times M} \times A_{N \times M}{}^H \times W_{N \times N} \times X_p) \tag{15}$$

When N>>M, $\delta$ can be approximated as:

$$\delta = \left(\frac{N-M}{N}\right)^2 \tag{16}$$

Figure 19:
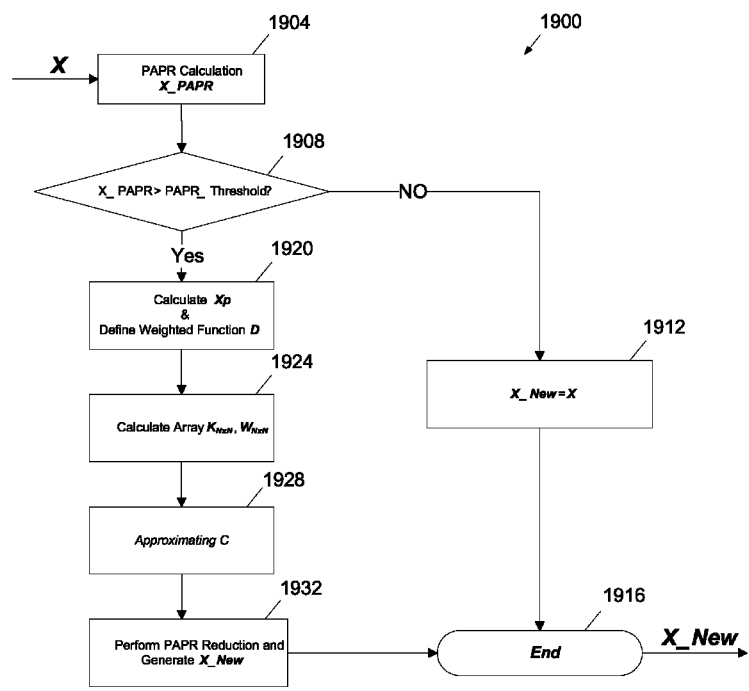
FIG. 19 is a flowchart illustrating an approximation process that may be performed by a WTR method in an OFDMA communication system in accordance with some embodiments.

FIG. 19 is a flowchart illustrating an approximation process 1900 that may be performed by the WTR method 1802 in the OFDMA communication system 1800 in accordance with some embodiments. Some system parameters related to processing by the approximation process 1900 may include: FFT size, N, set to 1024 for a 10 MHz OFDMA communication system; number of reserved tones, M, and the locations of reserved tones set by sequence T $\{t_k\}$, k=1~M, $1 \leq t_k \leq N$; IFFT transforming a 2 dimensional N×N array A expressed as $$A_{p,q} = \frac{1}{N} \exp\left(\frac{2\pi pq}{N} i\right),$$

where i is an imaginary unit; a constant value PAPR_Threshold set as the threshold if X is to perform PAPR reduction; and the modified factor, $\delta$, is set as provided by equation (16).

Given these system parameters, which may be varied in other embodiments, the approximation process 1900 may be explained with reference to FIG. 19.

At block 1904, a PAPR value of an input sequence X may be calculated by:

$$X\_PAPR = 10\log_{10} \frac{\text{Max}(|X|^2)}{E(|X|^2)}. \tag{17}$$

Due to digital sampling sequence of X, if more accurate computation is desired, a, e.g., 2 or 4 times up-sampling transform for X can be done before using equation (17) to calculate PAPR.

At block 1908, the PAPR value X_PAPR may be compared with a threshold PAPR value, PAPR_Threshold, to determine whether a PAPR reduction is desired.

If no PAPR reduction is desired, the process may proceed to block 1912, where the generated sequence, X_New, may be set equal to the original sequence and the process may conclude with the output of X_New at block 1916.

If it is determined, at block 1908, that a reduction is desired, the process may proceed to block 1920.

At block 1920, the process may calculate Xp and define the weighted function D as follows. To calculate Xp, a clipping threshold CT may be generated as follows:

$$CT = CR \times \sqrt{2} \times \text{std}(X), \tag{18}$$

where CR is a clipping rate value, which may be chosen at system implementation. In some embodiments it may be a value between 0~$\sqrt{2}$. In many embodiments, the value may be near 1. A clipping rate of 0.8 is used in the described embodiments. The function std(X) returns a standard deviation of X.

The clipping process may be performed to generate the signal sequence Xp and, at the same time, generate the weighted factor sequence D. The clipping process in accordance with some embodiments of this disclosure may be expressed by the following pseudo-code:

```
for i = 0 to N-1
    if |X| > CT then
        Xp(i) = X(i) − X(i)/|X(i)| × CT;
    else
        Xp(i) = 0;
    End of if
    D = (|X|²) + α × E(|X|²)
End of for.
```

$\alpha$, as noted above, is a parameter that can be set as 0.1~1.5 in accordance with some embodiments.

At block 1924, the approximation process 1900 may calculate $W_{N \times N}$ by using equation (6) and array $K_{N \times N}$ by using equation (12). It may be noted that, because $W_{N \times N}$ is a diagonal matrix, determining its inverse is a simply mathematical operation as shown at equation (12). Its computation complexity is linear, unlike the exponential computation complexity required to determine the inverse in equation (4) through the general inverse matrix.

At block 1928, the approximation process 1900 may approximate the sequence, C, by performing a kernel processing formula according to equation (15).

At block 1932, the approximation process 1900 may perform the PAPR reduction. The first phase of the PAPR reduction may be to construct sequence C by performing equation (5) for j=0 to N−1. Here, $C_j$ may be an element of N length in sequence C.

At block 1932, the approximation process may perform the second phase of the PAPR reduction by using the following equation:

$$X_{new} = X - AC. \quad (19)$$

The approximation process 1900 process may end with the output of X_new at block 1916.

The approximation process 1900 for the WTR method 1802 may be evaluated using simulation, to evaluate the efficiency of weighted factor D, expressed in equation (5), above. Simulation parameters are selected as follows: 1024 IFFT, 1000 randomly generated OFDM symbols, and a QPSK modulation.

Figure 20:
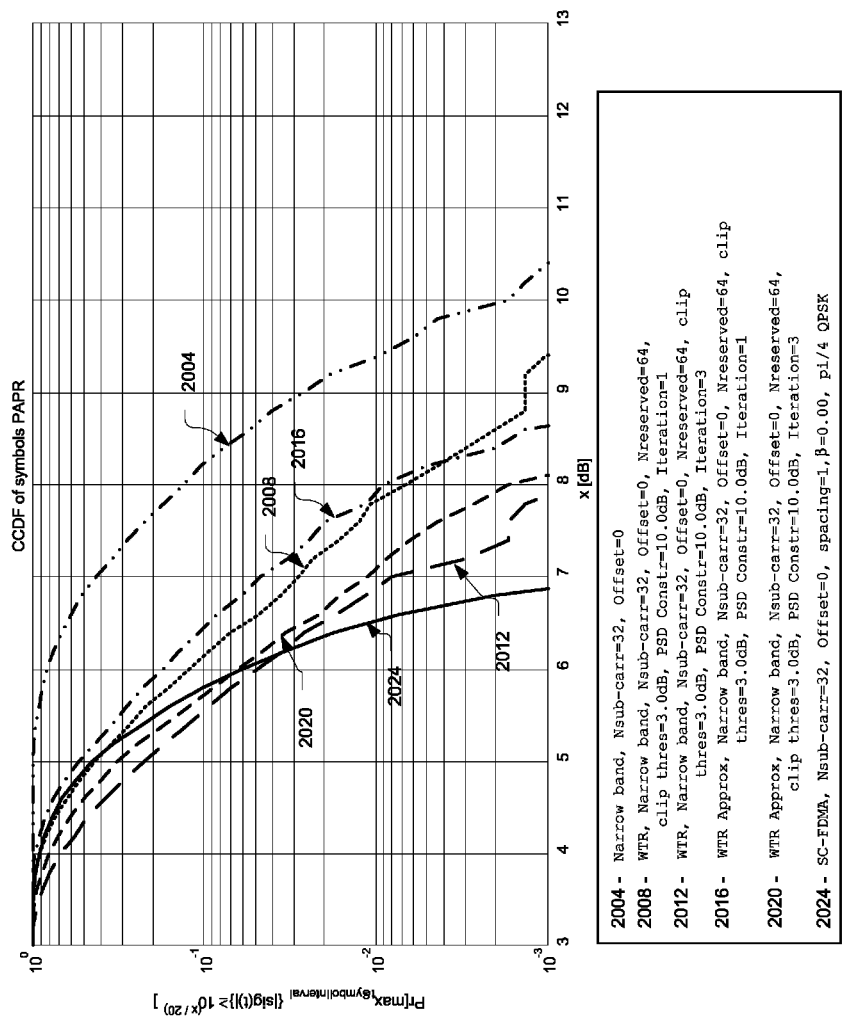
FIG. 20 illustrates PAPR reduction results of WTR calculations compared to WTR approximations in accordance with various embodiments.

FIG. 20 illustrates PAPR reduction results of a WTR calculations compared to WTR approximations in accordance with various embodiments.

Line 2004 represents a narrowband signal with 32 subcarriers and 0 offset.

Line 2008 represents a first iteration of a WTR calculation of a narrowband signal with 32 subcarriers, 0 offset, 64 reserved subcarriers, a clip threshold of 3.0 dB, and a PSD constraint of 10.0 dB.

Line 2012 represents a third iteration of a WTR calculation of a narrowband signal with 32 subcarriers, 0 offset, 64 reserved subcarriers, a clip threshold of 3.0 dB, and a PSD constraint of 10.0 dB.

Line 2016 represents a first iteration of a WTR approximation of a narrowband signal with 32 subcarriers, 0 offset, 64 reserved subcarriers, a clip threshold of 3.0 dB, and a PSD constraint of 10.0 dB.

Line 2020 represents a third iteration of a WTR approximation of a narrowband signal with 32 subcarriers, 0 offset, 64 reserved subcarriers, a clip threshold of 3.0 dB, and a PSD constraint of 10.0 dB.

Line 2024 represents an SC-FDMA signal with 32 subcarriers, 0 offset, a spacing of 1, β equal to 0, and a pi/4 QPSK.

As can be seen, the WTR approximations, lines 2016 and 2020, closely track the WTR calculations, 2008 and 2012, respectively.

Figure 21:
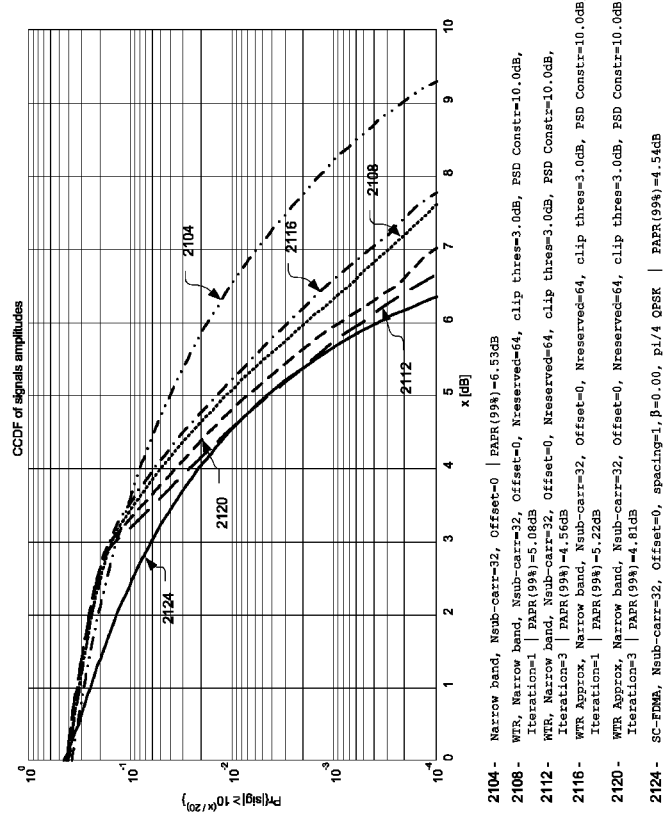
FIG. 21 illustrates a CCDF of signals' amplitudes of WTR calculations compared to WTR approximations in accordance with various embodiments.

FIG. 21 illustrates a CCDF of signals' amplitudes of WTR calculations compared to WTR approximations in accordance with various embodiments.

Line 2104 represents a narrowband signal with 32 subcarriers and 0 offset. The signal may have a 99% PAPR equal to 6.53 dB Line 2108 represents a first iteration of a WTR calculation of a narrowband signal with 32 subcarriers, 0 offset, 64 reserved subcarriers, a clip threshold of 3.0 dB, and a PSD constraint of 10.0 dB. The signal may have a 99% PAPR equal to 5.08 dB.

Line 2112 represents a third iteration of a WTR calculation of a narrowband signal with 32 subcarriers, 0 offset, 64 reserved subcarriers, a clip threshold of 3.0 dB, and a PSD constraint of 10.0 dB. The signal may have a 99% PAPR equal to 4.56 dB.

Line 2116 represents a first iteration of WTR approximation of a narrowband signal with 32 subcarriers, 0 offset, 64 reserved subcarriers, a clip threshold of 3.0 dB, and a PSD constraint of 10.0 dB. The signal may have a 99% PAPR equal to 5.22 dB.

Line 2120 represents a third iteration of a WTR approximation of a narrowband signal with 32 subcarriers, 0 offset, 64 reserved subcarriers, a clip threshold of 3.0 dB, and a PSD constraint of 10.0 dB. The signal may have a 99% PAPR equal to 4.81 dB.

Line 2124 represents a SC-FDMA signal with 32 subcarriers, 0 offset, a spacing of 1, β equal to 0, and pi/4 QPSK. The signal may have a 99% PAPR equal to 4.54 dB.

As can be seen from FIG. 21, there is only a 0.2 dB loss by using the WTR approximation process of the WTR method 1802 on 99% points.

Thus, utilizing the WTR approximation process, as described above, may provide a low computation complexity approach to determine a WTR in accordance with some embodiments. In other embodiments, other processes may be used to reduce the computation complexity of implementing a WTR method 1802.

In some embodiments, e.g., when the OFDM uplink channel is distributed across, e.g., PUSC channels, the WTR calculation and WTR approximation processes may call for an excessive amount of reserved tones to reduce the PAPR. This may result in a wider band being desired for PUSC PAPR reduction due to the wide band of clipped signal on the frequency domain. Furthermore, if a wide band is used as a reserve tone, the computing complexity may increase to an unacceptable level in some implementations.

Figure 22:
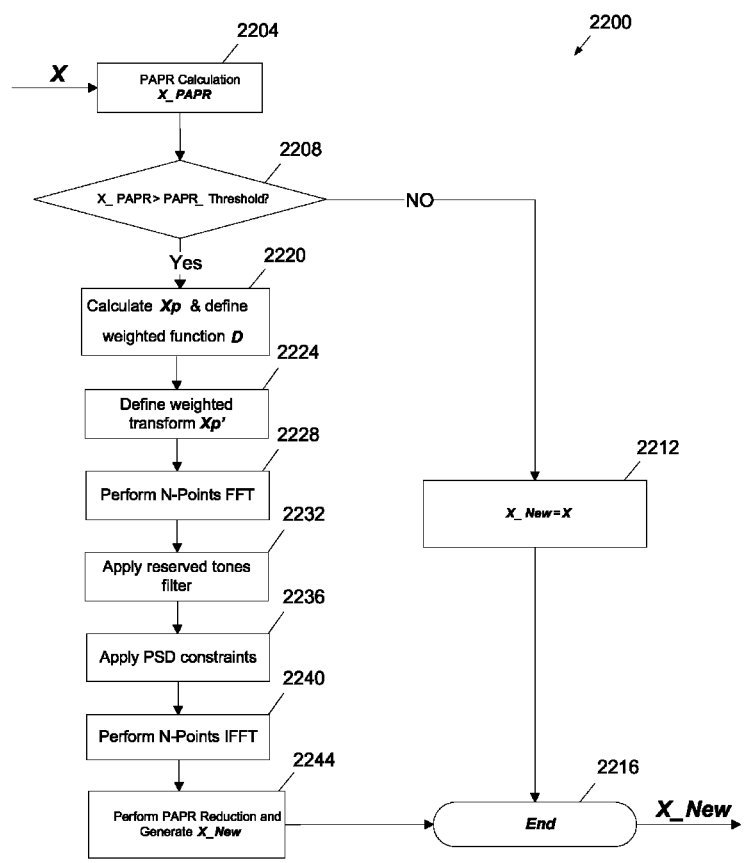
FIG. 22 is a flowchart illustrating a simplification process that may be performed by a WTR method in an OFDMA communication system in accordance with some embodiments.

Accordingly, in some embodiments a simplification process 2200, as described in FIG. 22, may be performed by the WTR method 1802 in the OFDMA communication system 1800 for uplink distributed channels.

In the simplification process 2200, the X_PAPR may calculated at block 2204 and compared to a PAPR_Threshold at block 2208, similar to the approximation process 1900 described above with respect to FIG. 19. Further similar to the approximation process 1900 if no PAPR reduction is desired, X_New may be set equal to X at block 2212 and output at block 2216. If it is determined, at block 2208, that a PAPR reduction is desired, then the clipped signal $X_p$ may be calculated and the weighted function, D, may be defined in a manner similar to that described above with respect to the approximation process 1900.

At block 2224, the simplification process 2200 may use the clipped signal $X_p$ and the weighted function D to define a weighted transform $X_p'$ as follows:

$$X_p' = W_{N \times N} X_p$$

Where W is the normalized weighted array:

$$W = \begin{Bmatrix} \frac{D_1}{D_{max}} & 0 & \cdots & \cdots & 0 \\ 0 & \cdots & 0 & \cdots & \cdots \\ \cdots & 0 & \frac{D_i}{D_{max}} & 0 & \cdots \\ \cdots & \cdots & 0 & \cdots & 0 \\ 0 & \cdots & \cdots & 0 & \frac{D_N}{D_{max}} \end{Bmatrix}_{N \times N} \quad (20)$$

At block 2228, the simplification process 2200 may perform a time domain to frequency domain transform by using an FFT as follows:

$$C_N = FFT_N(X_p').$$

At block 2232, the simplification process 2200 may apply a reserved tones filter to set all components of $C_N$ that are not in a location of a reserved tone equal to 0 as follows:

$$C_N'(i) = \begin{cases} C_N(i), & i \in \text{Reserved Tones} \\ 0, & i \notin \text{Reserved Tones} \end{cases} \quad (21)$$

At block 236, the simplification process 2200 may apply PSD constraints as follows:

$$C_N''(i) = \begin{cases} C_N'(i) & \text{If } |C_N'(i)| \leq F_{Threshold} \\ e^{j \times angle(C_N'(i))} F_{Threshold} & \text{If } |C_N'(i)| > F_{Threshold} \end{cases} \quad (22)$$

At block 2240, the simplification process 2200 may apply PAPR reductions using IFFT as follows:

$$X_{new} = X - IFFT(C_N'') \quad (23)$$

The simplification process 2200 may then perform the PAPR reduction to generate X_New, which may be output at block 2216.

The simplification process 2200 for the WTR method 1802 may be evaluated using simulation. For the simulation, the reserved model may be defined as follows: model C1—data tones by PUSC mode, all non-data tones (exclude DC) are selected as reserved tones, by strongly PSD constraints (e.g., >20 dB), without self-distortion; and model C2—data tones by PUSC mode, all information tones (exclude DC) are selected as reserved tones, by strongly PSD constraints (e.g., >20 dB), with self-distortion. Simulation parameters are selected as follows: 1024 IFFT, 1000 randomly generated OFDM symbols, and a QPSK modulation.

Figure 23:
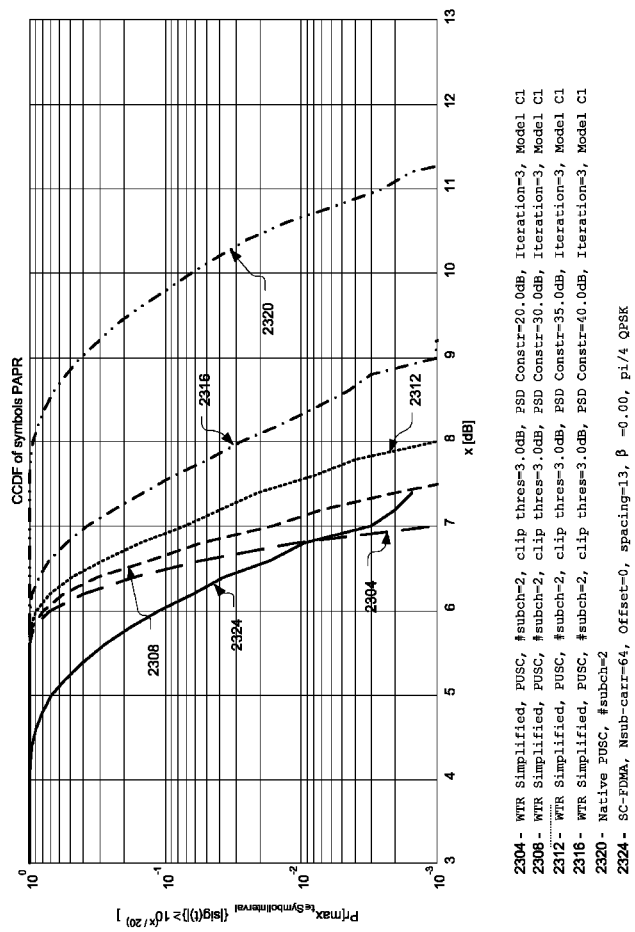
FIG. 23 illustrates PAPR reduction results of WTR simplifications in accordance with some embodiments.

FIG. 23 illustrates PAPR reduction results of the WTR simplification in accordance with some embodiments.

Line 2304 represents a third iteration of a second subchannel of a PUSC signal with a clip threshold of 3 dB, a PSD constraint of 20 dB, and a C1 reserved model.

Line 2308 represents a third iteration of a second subchannel of a PUSC signal with a clip threshold of 3 dB, a PSD constraint of 30 dB, and a C1 reserved model.

Line 2312 represents a third iteration of a second subchannel of a PUSC signal with a clip threshold of 3 dB, a PSD constraint of 35 dB, and C1 reserved model.

Line 2316 represents a third iteration of a second subchannel of a PUSC signal with a clip threshold of 3 dB, a PSD constraint of 40 dB, and C1 reserved model.

Line 2320 represents a second subchannel of a native PUSC signal.

Line 2324 represents an SC-FDMA signal with 64 subcarriers, 0 offset, a spacing of 13, β equal to 0, and a pi/4 QPSK.

As can be seen, the PAPR reduction results of the WTR simplification process track very closely to the PAPR reduction of the SC-FDMA signal.

Figure 24:
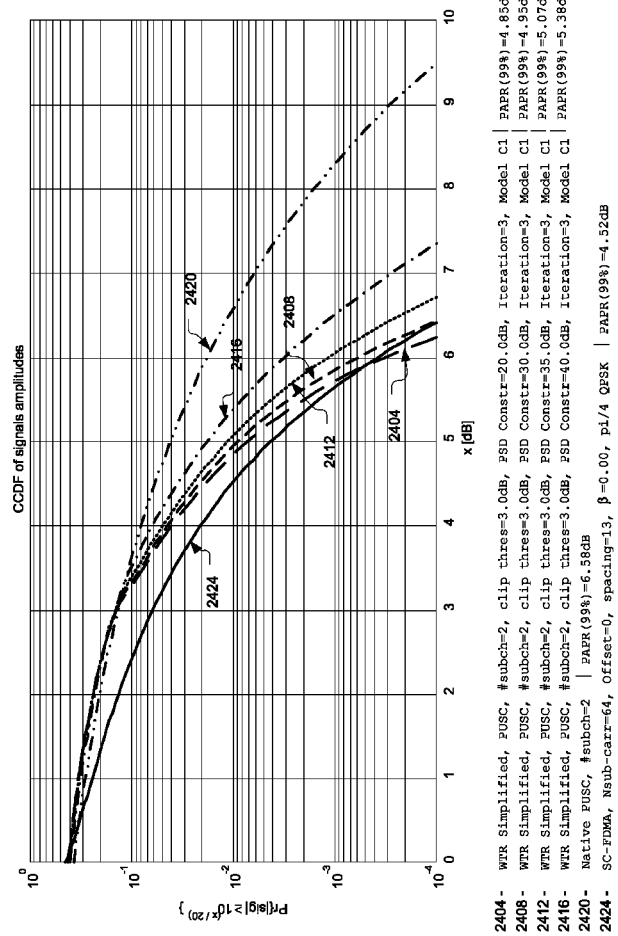
FIG. 24 illustrates CCDF of signals' amplitudes of WTR simplifications in accordance with various embodiments.

FIG. 24 illustrates a CCDF of signals' amplitudes of WTR simplifications in accordance with various embodiments.

Line 2404 represents a WTR simplification of a third iteration of a second subchannel of a PUSC signal with a clip threshold of 3 dB, a PSD constraint of 20 dB, and a C1 reserved model. The signal may have a 99% PAPR equal to 4.85 dB.

Line 2408 represents a WTR simplification of a third iteration of a second subchannel of a PUSC signal with a clip threshold of 3 dB, a PSD constraint of 30 dB, and a C1 reserved model. The signal may have a 99% PAPR equal to 4.95 dB.

Line 2412 represents a WTR simplification of a third iteration of a second subchannel of a PUSC signal with a clip threshold of 3 dB, a PSD constraint of 35 dB, and a C1 reserved model. The signal may have a 99% PAPR equal to 5.07 dB.

Line 2416 represents a WTR simplification of a third iteration of a second subchannel of a PUSC signal with a clip threshold of 3 dB, a PSD constraint of 40 dB, and a C1 reserved model. The signal may have a 99% PAPR equal to 5.38 dB.

Line 2420 represents a second subchannel of a native PUSC signal. The signal may have a 99% PAPR equal to 6.58 dB.

Line 2424 represents a SC-FDMA signal with 64 subcarriers, 0 offset, a spacing of 13, β equal to 0, and pi/4 QPSK. The signal may have a 99% PAPR equal to 4.52 dB.

As can be seen, there is only a 0.3 dB difference between the amplitudes of the signal CCDF of the WTR simplification as compared to the SC-FDMA on 99% points, when a 20 dB constraint was applied.

Figure 25:
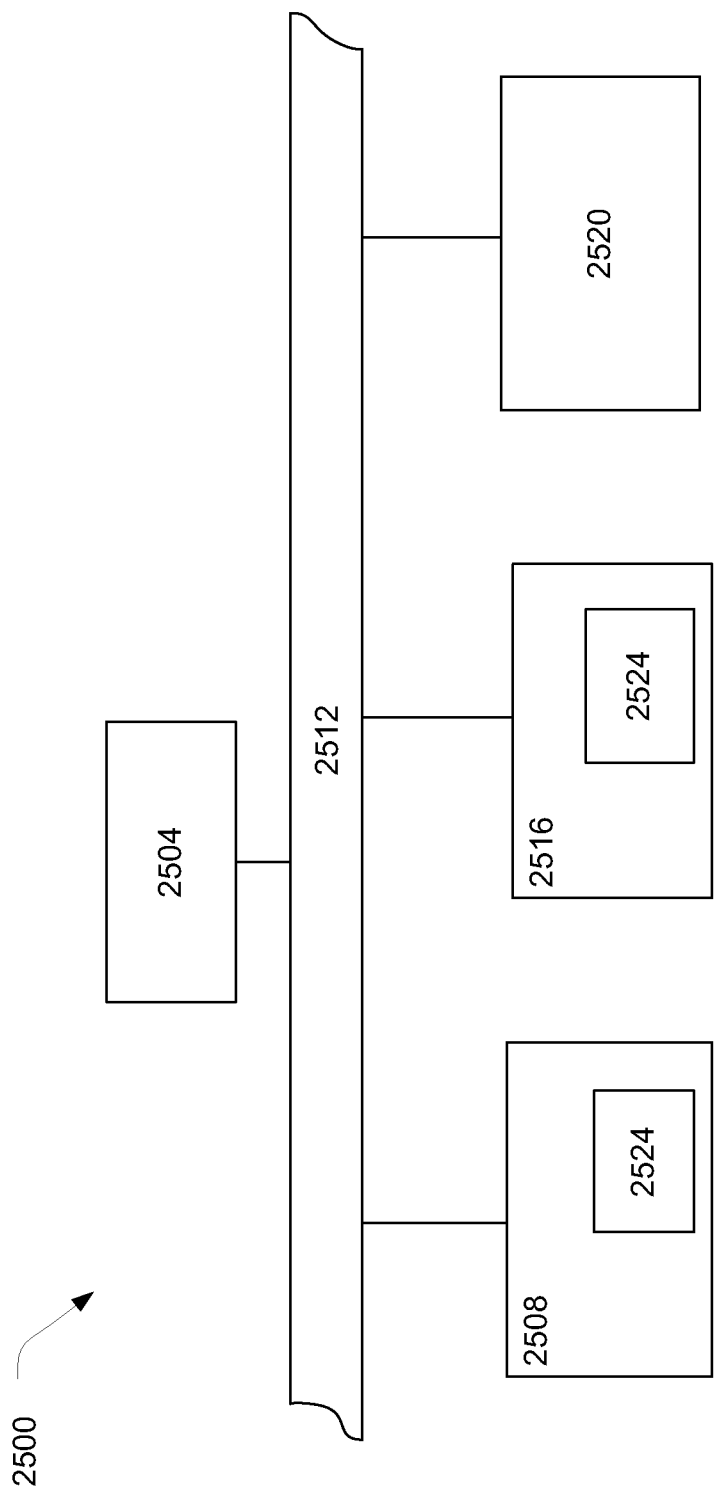
FIG. 25 illustrates a computing device capable of implementing an OFDMA communication system in accordance with embodiments of this disclosure.

FIG. 25 illustrates a computing device 2500 capable of implementing an OFDMA communication system in accordance with various embodiments. As illustrated, for the embodiments, computing device 2500 includes processor 2504, memory 2508, and bus 2512, coupled to each other as shown. Additionally, computing device 2500 includes storage 2516, and communication interfaces 2520, e.g., a wireless network interface card (WNIC), coupled to each other, and the earlier described elements as shown.

Memory 2508 and storage 2516 may include in particular, temporal and persistent copies of coding and mapping logic 2524, respectively. The coding and mapping logic 2524 may include instructions that when accessed by the processor 2504 result in the computing device 2500 performing TR techniques described in conjunction with various stations in accordance with embodiments of this disclosure. In particular, these TR techniques may allow a system, e.g., BS 104, MS 108, OFDMA communication system 1800, to perform CLSPR and/or a WTR method, which may include an approximation and/or simplification process, as described herein.

In various embodiments, the memory 2508 may include RAM, dynamic RAM (DRAM), static RAM (SRAM), synchronous DRAM (SDRAM), dual-data rate RAM (DDRRAM), etc.

In various embodiments, the processor 2504 may include one or more single-core processors, multiple-core processors, controllers, application-specific integrated circuits (ASICs), etc.

In various embodiments, storage 2516 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc.

In various embodiments, storage 2516 may be a storage resource physically part of the computing device 2500 or it may be accessible by, but not necessarily a part of, the computing device 2500. For example, the storage 2516 may be accessed by the computing device 2500 over a network.

In various embodiments, computing device 2500 may have more or less components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   recording, by a base station, received signal strength information of a plurality of mobile stations of a wireless neighborhood;
   estimating, by the base station, a received signal strength of an upcoming uplink transmission from each of one or more mobile stations, of the plurality of mobile stations, that will be allocated uplink resources in an orthogonal frequency division multiple access (OFDMA) frame;
   determining, by the base station, a desired peak-to-average power ratio (PAPR) reduction for each of the one or more mobile stations for the OFDMA frame based at least in part on the estimated received signal strength;
   determining, by the base station, a tone reservation mode to implement at a first mobile station of the one or more mobile stations based at least in part on the desired PAPR reductions, the tone reservation mode to identify data tones, assigned to either the first mobile station or a second mobile station for communication with the base station in the OFDMA frame, that are simultaneously to be used by the first mobile station for transmitting a PAPR reduction sequence with a power below a power spectrum density constraint to avoid interference with data transmissions; and
   transmitting, by the base station to the first mobile station, the tone reservation mode to implement at the first mobile station.

2. The method of claim 1, wherein said transmitting includes
   broadcasting the tone reservation mode.

3. The method of claim 2, wherein said broadcasting includes
   broadcasting the tone reservation mode in an uplink map information element.

4. The method of claim 1, wherein said estimating the received signal strength of an upcoming uplink transmission from each of the one or more mobile stations is based at least in part on received signal strength information of the one or more mobile stations.

5. A mobile station comprising processing circuitry configured to:
   receive, from a base station, uplink scheduling information that includes a tone reservation mode identifying first data tones, assigned to either the mobile station or another mobile station for uplink transmissions in an orthogonal frequency division multiple access (OFDMA) frame, and an indication of second data tones assigned to the mobile station for uplink transmissions in the OFDMA frame;
   transmit a data sequence on the second data tones; and
   transmit a peak-to-average power ratio (PAPR) reduction sequence on the first data tones with a power below a power spectrum density constraint to avoid interference with simultaneous data transmissions on the first data tones.

6. The mobile station of claim 5, wherein the processing circuitry is further configured to:
   receive an indication of a desired PAPR reduction from the base station; and
   generate the PAPR reduction sequence based at least in part on the desired PAPR reduction.

7. The mobile station of claim 5, wherein said transmission of the PAPR reduction sequence on the first data tones further comprises:
   transmission of a first portion of the PAPR reduction sequence on a first neighbor band, relative to the second data tones; and
   transmission of a second portion of the PAPR reduction sequence on a second neighbor band, relative to the second data tones.

8. The mobile station of claim 7, wherein said transmission of the PAPR reduction sequence on the first data tones further comprises:
   transmission of a third portion of the PAPR reduction sequence on the second data tones.

9. The mobile station of claim 5, wherein said transmission of the PAPR reduction sequence on the first data tones further comprises:
   transmission of the entire PAPR reduction sequence on the second data tones.

10. A weighted tone reservation method comprising:
    obtaining, by a wireless terminal, a first sequence, X, that is derived from binary input data;
    approximating, by the wireless terminal, a second sequence, C, by using $Ct_M \approx \delta \times (A_{N \times M}^H \times K_{N \times N} \times A_{N \times M} \times A_{N \times M}^H \times W_{N \times N} \times X_p)$, where $Ct_M$ is a length M vector from $C_t$ to C; $\delta$ is a modified factor; M is a number of reserved tones; N is a size of a fast Fourier transform (FFT); $A_{N \times M}$ is an N by M matrix of A, which is an inverse fast Fourier transform (IFFT) matrix of the second sequence, C; H is a conjugate transpose where $A^H = (A')^*$, A' is a transpose of matrix A, A* is a conjugate complex of matrix A; $W_{N \times N}$ is an N by N matrix of a weighted function, W; and $K_{N \times N} = W_{N \times N}^{l-1}$; and
    transmitting, by the wireless terminal over a wireless network, a third sequence based at least in part on the first sequence and the second sequence.

11. The method of claim 10, further comprising:
    providing the modified factor, $\delta$, according to:

$$\delta = \left(\frac{N-M}{N}\right)^2.$$

12. The method of claim 10, further comprising:
    providing the weighted function, W, according to:

$$W = \begin{Bmatrix} D_1 & 0 & \cdots & \cdots & 0 \\ 0 & \cdots & 0 & \cdots & \cdots \\ \cdots & 0 & D_i & 0 & \cdots \\ \cdots & \cdots & 0 & \cdots & 0 \\ 0 & \cdots & \cdots & 0 & D_N \end{Bmatrix}_{N \times N},$$

where $D=(|X|^2)+\alpha \times E(|X|^2)$ and $\alpha$ is a constant set at a value at or between 0.1 and 1.5.

13. A method comprising:
obtaining, by a wireless terminal, a first sequence that is derived from binary input data, the first sequence associated with a first peak-to-average power ratio (PAPR);
generating, by the wireless terminal, a clipped signal based at least in part on the first sequence;
generating, by the wireless terminal, a weighted transform based at least in part on a normalized weighted array and the clipped signal;
generating, by the wireless terminal, a second sequence by applying a reserved tones filter to a fast Fourier transform (FFT) of the weighted transform;
applying, by the wireless terminal, power spectrum constraints on the second sequence to generate a third sequence; and
generating, by the wireless terminal, a fourth sequence based at least in part on the first sequence and an inverse FFT (IFFT) of the third sequence, the fourth sequence associated with a second PAPR that is less than the first PAPR.

14. The method of claim 13, wherein said generating the fourth sequence comprises:
subtracting the IFFT of the third sequence from the first sequence.

15. The method of claim 13, wherein generating the second sequence by applying the reserved tones filter comprises:
setting all components of the FFT of the weighted transform that are not in a location of a reserved tone equal to zero.

16. The method of claim 13, wherein the clipped signal is $X_p$, the normalized weighted array is $W_{N \times N}$, the weighted transform is $X_p'$, and said generating the weighted transform, $X_p'$, is done according to $X_p' = W_{N \times N} X_p$.

17. The method of claim 13, wherein the first sequence is X, and the normalized weighted array is W and is provided according to:

$$W = \begin{Bmatrix} \frac{D_1}{D_{max}} & 0 & \cdots & \cdots & 0 \\ 0 & \cdots & 0 & \cdots & \cdots \\ \cdots & 0 & \frac{D_i}{D_{max}} & 0 & \cdots \\ \cdots & \cdots & 0 & \cdots & 0 \\ 0 & \cdots & \cdots & 0 & \frac{D_N}{D_{max}} \end{Bmatrix}_{N \times N},$$

where $D=(|X|^2)+\alpha \times E(|X|^2)$ and $\alpha$ is a constant value.

18. The method of claim 17, wherein the constant value of $\alpha$ is set at or between 0.1 and 1.5.

19. The method of claim 13, wherein the second sequence is $C_N'$ and the third sequence is $C_N''$, and said applying of the power spectrum constraints on the second sequence to generate the third sequence is according to:

$$C_N''(i) = \begin{cases} C_N'(i) & \text{If } |C_N'(i)| \leq F_{Threshold} \\ e^{j \times angle(C_N'(i))} F_{Threshold} & \text{If } |C_N'(i)| > F_{Threshold} \end{cases}.$$

* * * * *

UNITED STATES PATENT AND TRADEMARK OFFICE
CERTIFICATE OF CORRECTION

PATENT NO. : 8,416,675 B2  Page 1 of 1
APPLICATION NO. : 12/242751
DATED : April 9, 2013
INVENTOR(S) : Rongzhen Yang et al.

It is certified that error appears in the above-identified patent and that said Letters Patent is hereby corrected as shown below:

In the Claims

Column 18

Line 44, claim 10, "...$W_{N \times N}^{l-1}$..." should read --...$W_{N \times N}^{-1}$...--.

Column 18

Line 66, claim 12, "...0.1and..." should read --...0.1 and...--.

Column 20

Line 20, claim 17, "...0. 1..." should read --...0.1...--.

Signed and Sealed this
Twenty-third Day of June, 2015

Michelle K. Lee
*Director of the United States Patent and Trademark Office*